(12) United States Patent
Odeh et al.

(10) Patent No.: US 9,522,364 B2
(45) Date of Patent: *Dec. 20, 2016

(54) TREATED MIXED MATRIX POLYMERIC MEMBRANES

(71) Applicant: SABIC Global Technologies B.V., Amsterdam (NL)

(72) Inventors: Ihab N. Odeh, Sugar Land, TX (US); Lei Shao, Thuwal (SA); Yunyang Liu, Thuwal (SA)

(73) Assignee: SABIC Global Technologies B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/031,871

(22) PCT Filed: Dec. 15, 2014

(86) PCT No.: PCT/US2014/070335
§ 371 (c)(1),
(2) Date: Apr. 25, 2016

(87) PCT Pub. No.: WO2015/095044
PCT Pub. Date: Jun. 25, 2015

(65) Prior Publication Data
US 2016/0263533 A1    Sep. 15, 2016

Related U.S. Application Data

(63) Continuation of application No. 61/916,629, filed on Dec. 16, 2013.

(51) Int. Cl.
*B01D 53/22* (2006.01)
*B01D 69/14* (2006.01)
(Continued)

(52) U.S. Cl.
CPC ........... *B01D 69/148* (2013.01); *B01D 53/228* (2013.01); *B01D 67/009* (2013.01);
(Continued)

(58) Field of Classification Search
CPC . B01D 53/228; B01D 67/0079; B01D 67/009; B01D 69/148; B01D 71/02; B01D 71/028; B01D 71/52; B01D 71/56; B01D 71/64
See application file for complete search history.

(56) References Cited

U.S. PATENT DOCUMENTS

| | | | |
|---|---|---|---|
| 4,156,597 A | 5/1979 | Browall | 95/47 |
| 4,468,506 A | 8/1984 | Holub et al. | 525/432 |

(Continued)

FOREIGN PATENT DOCUMENTS

| | | |
|---|---|---|
| AU | 2011369056 | 11/2012 |
| CA | 2600808 | 7/2013 |

(Continued)

OTHER PUBLICATIONS

Wijenayake, Sumudu N. et al., "Sufrace Cross-Linking of ZIF-8/Polyimide Mixed Matrix Membranes (MMMs) for Gas Separation", Apr. 2013, Ind. Eng. Chem. Res., 52, pp. 6991-7001.*

(Continued)

*Primary Examiner* — Jason M Greene
(74) *Attorney, Agent, or Firm* — Norton Rose Fulbright US LLP

(57) ABSTRACT

Disclosed are treated mixed matrix polymeric membranes comprising a plurality of metal-organic frameworks (MOFs) and a polymeric matrix, wherein the plurality of MOFs are attached to the polymeric matrix through covalent or hydrogen bonds or Van der Waals interaction. The membranes can be treated with plasma, electromagnetic radiation, or thermal energy or any combination thereof.

20 Claims, 16 Drawing Sheets

$R_1$=H, -$(CH_2)_n CH_3$, -CN, -$NO_2$, -CHO, -F, -Cl, -Br, n=0-20
$R_2$=H, -$(CH_2)_n CH_3$, -CN, -$NO_2$, -CHO, -F, -Cl, -Br, n=0-20
$R_3$=H, -$(CH_2)_n CH_3$, -CN, -$NO_2$, -CHO, -F, -Cl, -Br, n=0-20
$R_4$=H, -$(CH_2)_n CH_3$, -CN, -$NO_2$, -CHO, -F, -Cl, -Br, n=0-20
$R_5$=H, -$(CH_2)_n CH_3$, -CN, -$NO_2$, -CHO, -F, -Cl, -Br, n=0-20

(51) Int. Cl.

| | | |
|---|---|---|
| *B01D 67/00* | (2006.01) | |
| *B01D 71/64* | (2006.01) | |
| *B01D 71/52* | (2006.01) | |
| *B01D 71/72* | (2006.01) | |
| *B01D 63/02* | (2006.01) | |
| *B01D 63/06* | (2006.01) | |
| *B01D 63/08* | (2006.01) | |
| *B01D 63/10* | (2006.01) | |

(52) U.S. Cl.
CPC ......... *B01D 67/0079* (2013.01); *B01D 71/52* (2013.01); *B01D 71/64* (2013.01); *B01D 71/72* (2013.01); *B01D 63/02* (2013.01); *B01D 63/06* (2013.01); *B01D 63/08* (2013.01); *B01D 63/10* (2013.01); *B01D 2323/08* (2013.01); *B01D 2323/34* (2013.01); *B01D 2323/345* (2013.01); *B01D 2323/35* (2013.01); *B01D 2325/02* (2013.01)

(56) References Cited

U.S. PATENT DOCUMENTS

| | | | |
|---|---|---|---|
| 4,607,088 A | 8/1986 | Nomura et al. | 526/279 |
| 4,657,564 A | 4/1987 | Langsam | 95/51 |
| 4,828,585 A | 5/1989 | Chiao | 95/47 |
| 4,933,132 A | 6/1990 | Vora | 264/331.14 |
| 5,028,453 A | 7/1991 | Jeffrey et al. | 427/575 |
| 5,055,116 A | 10/1991 | Kohn et al. | 95/47 |
| 5,095,060 A | 3/1992 | Haaf | 524/293 |
| 5,106,915 A | 4/1992 | Rock et al. | 525/431 |
| 5,181,940 A | 1/1993 | Bikson et al. | 95/47 |
| RE34,296 E | 6/1993 | Roesink et al. | 521/50 |
| 5,246,743 A * | 9/1993 | Kusuki | B01D 67/009 427/296 |
| 5,248,319 A | 9/1993 | Ekiner et al. | 95/54 |
| 5,443,728 A | 8/1995 | MacHeras et al. | 210/500.23 |
| 5,514,276 A | 5/1996 | Babcock et al. | 210/490 |
| 5,635,067 A | 6/1997 | MacHeras | 210/500.23 |
| 5,647,894 A | 7/1997 | Ohara et al. | 96/13 |
| 5,707,895 A | 1/1998 | Wuu et al. | 438/158 |
| 5,837,032 A | 11/1998 | Moll et al. | 95/45 |
| 5,869,172 A | 2/1999 | Caldwell | 428/306.6 |
| 5,910,274 A | 6/1999 | MacHeras et al. | 264/41 |
| 6,383,265 B1 | 5/2002 | Ekiner | 96/10 |
| 6,399,159 B1 | 6/2002 | Grace et al. | 427/536 |
| 6,431,182 B1 | 8/2002 | Rakhshandehroo et al. | 134/1.2 |
| 6,500,233 B1 | 12/2002 | Miller et al. | 95/50 |
| 6,508,860 B1 | 1/2003 | Kulkarni et al. | 95/51 |
| 6,585,802 B2 | 7/2003 | Koros et al. | 95/51 |
| 6,730,364 B2 | 5/2004 | Hong et al. | 427/535 |
| 6,946,211 B1 | 9/2005 | Bjerrum et al. | 429/480 |
| 7,018,445 B2 | 3/2006 | Simmons et al. | 95/51 |
| 7,048,846 B2 | 5/2006 | White et al. | 208/208 R |
| 7,306,647 B2 | 12/2007 | Miller et al. | 95/45 |
| 7,361,800 B2 | 4/2008 | Herrera et al. | 585/818 |
| 7,381,858 B2 | 6/2008 | Huff, Jr. et al. | 585/805 |
| 7,410,525 B1 | 8/2008 | Liu et al. | 95/45 |
| 7,432,311 B2 | 10/2008 | Mezzenga et al. | 521/64 |
| 7,485,173 B1 | 2/2009 | Liu et al. | 95/45 |
| 7,531,120 B2 | 5/2009 | Van Rijn et al. | 264/299 |
| 7,637,983 B1 * | 12/2009 | Liu | B01D 67/0079 210/500.21 |
| 7,658,784 B2 | 2/2010 | Fritsch et al. | 95/45 |
| 7,690,514 B2 | 4/2010 | McKeown et al. | 210/500.22 |
| 7,758,751 B1 | 7/2010 | Liu et al. | 210/321.6 |
| 7,785,397 B2 | 8/2010 | Kumar et al. | 95/51 |
| 7,806,962 B2 | 10/2010 | Liu et al. | 95/45 |
| 7,815,712 B2 | 10/2010 | Liu et al. | 95/45 |
| 7,846,496 B2 | 12/2010 | Liu et al. | 427/244 |
| 7,942,274 B2 | 5/2011 | Kools et al. | 210/500.21 |
| 7,943,543 B1 | 5/2011 | Liu et al. | 502/4 |
| 7,950,529 B2 | 5/2011 | Kulkarni et al. | 210/500.39 |
| 7,998,246 B2 | 8/2011 | Liu et al. | 95/45 |
| 8,034,857 B2 | 10/2011 | Kailasam et al. | 524/115 |
| 8,048,198 B2 | 11/2011 | Liu et al. | 95/45 |
| 8,056,732 B2 | 11/2011 | McKeown et al. | 210/500.22 |
| 8,127,936 B2 | 3/2012 | Liu et al. | 210/500.39 |
| 8,226,862 B2 | 7/2012 | Liu et al. | 264/45.9 |
| 8,241,501 B2 | 8/2012 | Liu et al. | 210/640 |
| 8,268,934 B2 | 9/2012 | Gallucci et al. | 525/397 |
| 8,318,013 B2 | 11/2012 | Zhou et al. | 210/321.72 |
| 8,337,598 B2 | 12/2012 | Yates et al. | 96/10 |
| 8,561,812 B2 | 10/2013 | Liu et al. | 210/500.39 |
| 8,613,362 B2 | 12/2013 | Liu et al. | 210/500.39 |
| 2004/0198587 A1 | 10/2004 | McKeown et al. | 502/100 |
| 2004/0258952 A1 | 12/2004 | Haghighat et al. | 428/690 |
| 2005/0000899 A1 | 1/2005 | Koros et al. | 210/650 |
| 2006/0138043 A1 | 6/2006 | Kharul et al. | 210/490 |
| 2006/0194070 A1 | 8/2006 | Croll et al. | 428/473.5 |
| 2006/0196355 A1 | 9/2006 | Ekiner et al. | 95/45 |
| 2006/0249018 A1 | 11/2006 | Wang et al. | 95/45 |
| 2007/0202038 A1 | 8/2007 | Yaghi et al. | 423/702 |
| 2008/0119615 A1 | 5/2008 | Gallucci et al. | 525/418 |
| 2008/0119616 A1 | 5/2008 | Donovan et al. | 525/432 |
| 2008/0142440 A1 | 6/2008 | Liu et al. | 210/640 |
| 2008/0214687 A1 | 9/2008 | Muller et al. | 521/54 |
| 2008/0295691 A1 | 12/2008 | Liu et al. | 95/285 |
| 2008/0296527 A1 * | 12/2008 | Liu | B01D 67/0079 252/60 |
| 2009/0099299 A1 | 4/2009 | Gallucci et al. | 524/538 |
| 2009/0120875 A1 | 5/2009 | Liu et al. | 210/641 |
| 2009/0126567 A1 | 5/2009 | Liu et al. | 95/45 |
| 2009/0149313 A1 | 6/2009 | Liu et al. | 502/4 |
| 2009/0149565 A1 | 6/2009 | Liu et al. | 522/148 |
| 2009/0152755 A1 | 6/2009 | Liu et al. | 264/115 |
| 2009/0155464 A1 | 6/2009 | Liu et al. | 427/243 |
| 2010/0018926 A1 | 1/2010 | Liu et al. | 210/655 |
| 2010/0186588 A1 | 7/2010 | Yaghi et al. | 95/127 |
| 2010/0216899 A1 | 8/2010 | Allen et al. | 521/27 |
| 2010/0242723 A1 | 9/2010 | Liu et al. | 95/46 |
| 2010/0243556 A1 | 9/2010 | Kools et al. | 210/490 |
| 2010/0243567 A1 | 9/2010 | Liu et al. | 210/640 |
| 2010/0244306 A1 | 9/2010 | Tang | 264/165 |
| 2010/0313752 A1 | 12/2010 | Powell et al. | 95/45 |
| 2010/0320142 A1 | 12/2010 | Ge et al. | 210/500.27 |
| 2011/0023716 A1 | 2/2011 | Liu et al. | 96/4 |
| 2011/0059036 A1 | 3/2011 | Arnold et al. | 424/78.01 |
| 2011/0104509 A1 | 5/2011 | Poulsson et al. | 428/524 |
| 2011/0130611 A1 | 6/2011 | Gonzalez et al. | 585/818 |
| 2011/0138999 A1 | 6/2011 | Willis | 95/45 |
| 2011/0168624 A1 | 7/2011 | Wang et al. | 210/497.1 |
| 2012/0042777 A1 | 2/2012 | Lee et al. | 95/47 |
| 2012/0064283 A1 | 3/2012 | Hill et al. | 428/113 |
| 2012/0085233 A1 | 4/2012 | Liu et al. | 95/51 |
| 2012/0118011 A1 | 5/2012 | Terrien et al. | 62/619 |
| 2012/0121497 A1 | 5/2012 | Terrien et al. | 423/437.1 |
| 2012/0264589 A1 | 10/2012 | Du et al. | 502/4 |
| 2012/0276300 A1 | 11/2012 | Liu et al. | 427/521 |
| 2012/0322119 A1 | 12/2012 | Liu et al. | 435/161 |
| 2012/0322911 A1 | 12/2012 | Liu et al. | 522/164 |
| 2013/0121892 A1 | 5/2013 | Fuhrmann et al. | 422/502 |
| 2013/0197235 A1 * | 8/2013 | Thompson | B01D 53/02 548/103 |
| 2013/0217799 A1 | 8/2013 | Visser et al. | 521/180 |
| 2013/0247756 A1 | 9/2013 | Li et al. | 95/45 |
| 2013/0274087 A1 * | 10/2013 | da Silva Pinto | B01D 53/02 502/4 |
| 2013/0305920 A1 | 11/2013 | Yang et al. | 95/45 |
| 2013/0305927 A1 | 11/2013 | Choi et al. | 96/13 |
| 2013/0313193 A1 | 11/2013 | Nair et al. | 210/650 |
| 2014/0255636 A1 | 9/2014 | Odeh et al. | 428/36.5 |
| 2014/0345456 A1 | 11/2014 | Sano et al. | 95/51 |
| 2015/0283520 A1 * | 10/2015 | Hill | B01D 53/228 95/45 |
| 2016/0158703 A1 | 6/2016 | Priske et al. | 568/454 |

FOREIGN PATENT DOCUMENTS

| | | |
|---|---|---|
| CN | 1898008 | 1/2007 |
| CN | 101733026 | 6/2010 |
| CN | 101837228 | 9/2010 |
| CN | 102448591 A | 5/2012 |

(56) References Cited

FOREIGN PATENT DOCUMENTS

| | | |
|---|---|---|
| CN | 102448593 A | 5/2012 |
| CN | 103084078 | 5/2013 |
| EP | 0354514 | 2/1990 |
| EP | 0368447 | 5/1990 |
| EP | 0417513 | 3/1991 |
| EP | 0622111 | 11/1994 |
| EP | 0706819 | 4/1996 |
| EP | 1523053 | 4/2005 |
| EP | 2060315 | 5/2009 |
| JP | 588503 | 1/1983 |
| JP | 588517 | 1/1983 |
| JP | 6178406 | 4/1986 |
| JP | 61107923 | 5/1986 |
| JP | 6219206 | 1/1987 |
| JP | 63229123 | 9/1988 |
| JP | 02126927 | 5/1990 |
| JP | 05329342 | 12/1993 |
| JP | 07124449 | 5/1995 |
| JP | 7236822 | 9/1995 |
| JP | 03473300 B2 | 6/1998 |
| JP | 03331153 | 10/2002 |
| JP | 2003251162 | 9/2003 |
| JP | 2003251163 | 9/2003 |
| JP | 2004002808 | 1/2004 |
| JP | 2012072534 | 4/2012 |
| JP | 0549882 | 10/2012 |
| JP | 5049882 | 10/2012 |
| JP | 2013075264 | 4/2013 |
| KR | 19950007320 | 7/1995 |
| WO | WO 83/03416 | 10/1983 |
| WO | WO 0204083 | 1/2002 |
| WO | WO 0243937 | 6/2002 |
| WO | WO 2005012397 | 2/2005 |
| WO | WO 2005113121 | 12/2005 |
| WO | WO 2006135966 | 12/2006 |
| WO | WO 2007044473 | 4/2007 |
| WO | WO 2008076599 | 6/2008 |
| WO | WO 2008140788 | 11/2008 |
| WO | WO 2009064571 | 5/2009 |
| WO | WO 2009075947 | 6/2009 |
| WO | WO 2009075952 | 6/2009 |
| WO | WO 2009076025 | 6/2009 |
| WO | WO 2009092922 | 7/2009 |
| WO | WO 2009113747 | 9/2009 |
| WO | WO 2010002404 | 1/2010 |
| WO | WO 2010110968 | 9/2010 |
| WO | WO 2012082537 | 6/2012 |
| WO | WO 2012112122 | 8/2012 |
| WO | WO 2012159224 | 11/2012 |
| WO | WO 2013057492 | 4/2013 |
| WO | WO 2013073828 | 5/2013 |
| WO | WO 2013122247 | 8/2013 |
| WO | WO 2014137923 | 9/2014 |

OTHER PUBLICATIONS

Aaron et al., "Separation of CO2 from flue gas: a review", Sep. Sci. Technol. 40 (2005) 321-348.
Askari et al., "Natural gas purification and olefin/paraffin separation using thermal cross-linkable co-polyimide/ZIF-8 mixed matrix membranes", Journal of Membrane Science 444 (2013) 173-183.
Banerjee et al., "Control of Pore Size and Functionality in Isoreticular Zeolitic Imidazolate Frameworks and their Carbon Dioxide Selective Capture Properties", J. Am. Chem. Soc 131 (2009) 3875-3877.
Banergee, et al., "High-throughput synthesis of zeolitic imidazolate framework and application to CO2 capture", Science., 2008, 319:939-943.
Budd et al., "Gas separation membranes from polymers of intrinsic microporosity", J. Membrane Sci., 2005, 251, 263-269.
Chung et al., "Mixed matrix membranes (MMMs) comprising organic polymers with dispersed inorganic fillers for gas separation" Prog. Polym. Sci. 32 (2007) 483-507.
Cravillon et al., "Rapid Room-Temperature Synthesis and Characterization of Nanocrystals of a Prototypical Zeolitic Imidazolate Framework" Chem. Mater. 2009, 21, 1410-1412.
Ghanem et al., High-Performance Membranes from Polyimides with Intrinsic Microporosity, Adv. Mater. 2008, 20, 2766-2771.
Hayashi et al., "Zeolite a imidazolate frameworks", Nature Mater. 6 (2007) 501-506.
Hillock et al., "Crosslinked mixed matrix membranes for the purification of natural gas: Effects of sieve surface modification", Journal of Membrane Science. 2008, 314:193-199.
International Preliminary Report on Patentability for PCT/US2014/070335, mailed Apr. 6, 2016.
International Search Report and Written Opinion for PCT/US2014/070335, mailed Mar. 30, 2015.
Koros et al., "Pushing the limits on possibilities for large scale gas separation: which strategies?", J. Membr. Sci., 175 (2000) 181.
Li et al., "UV-Rearranged PIM-1 Polymeric Membranes for Advanced Hydrogen Purification and Production", Adv. Energy Mater., 2012, 2, 1456-1466.
Mahajan, et al., "Challenges in forming successful mixed matrix membranes with rigid polymeric materials", J Appl. Polym. Sci., 2002, 86:881.
Mersmann et al., "The potential of energy saving by gas-phase adsorption processes", Chem. Eng. Technol. 23 (2000) 937-944.
Moore et al., "Hybrid membrane materials comprising organic polymers with rigid dispersed phases", AIChE J., 50 (2004) 311.
Morris et al., "Crystals as Molecules: Postsynthesis Covalent Functionalization of Zeolitic Imidazolate Frameworks" J. Am. Chem. Soc., 130 (2008) 12626-12627.
Pal et al., "Characterization of CO2 plasma treated polymeric membranes and quantification of flux enhancement", Journal of Membrane Science, 323: 1-10, (2008).
Pan et al., "Effective separation of propylene/propane binary mixtures by ZIF-8 membranes", Journal of Membrane Science 390-391 (2012) 93-98.
Pan et al., "Synthesis of ceramic hollow fiber supported zeolitic imidazolate framework-8 (ZIF-8) membranes with high hydrogen permeability", Journal of Membrane Science 421-422 (2012) 292-298.
Park et al., "Exceptional chemical and thermal stability of zeolitic imidazolate frameworks", PNAS 103 (2006) 10186-10191.
Robeson, "Correlation of separation factor versus permeability for polymeric membranes", J. Membr. Sci., 62 (1991) 165-185.
Robeson, "The upper bound revisited", J Membr. Sci., 2008, 320:390-400.
Rosi, et al., "Rod packings and metal-organic frameworks constructed from rod-shaped secondary building units", J Am Chem Soc., 2005, 127(5):1504-18.
Thompson et al., "Hybrid Zeolitic Imidazolate Frameworks: Controlling Framework Porosity and Functionality by Mixed-Linker Synthesis", Chem. Mater., 24: 1930, (2012).
Venna, et al., "Highly permeable zeolite imidazolate framework-8 membranes for CO2/CH4 separation", J Am Chem Soc., 2010, 132:76-78.
Wang & Cohen, "Postsynthetic modification of metal-organic frameworks", Chem Soc Rev. 2009, 38(5):1315-29.
Yamaguchi et al., "Plasma-graft filling polymerization preparation of a new type of pervaporation membrane for organic liquid mixtures", Macromolecules, 24: 5522-5527, 1991.
Zhang et al., "High performance ZIF-8/6FDA-DAM mixed matrix membrane for propylene/propane separations", Journal of Membrane Science 389: 34-42, (2012).
Asako Shigero, Machine Translation of JP 61-107923, 1986, pp. 13.
Dai, Y. et al. "Ultem®/ZIF-8 Mixed Matrix Hollow Fiber Membranes for Co2/IN2 Separations." Journal of Membrane Science. vols. 401-402, pp. 76-82. 2012.
Du et al., "Advances in high permeability polymeric membrane materials for CO2 separations", Energy Environ. Sci. 5:7306-7322, 2012.
Du et al., "Azide-based Cross-Linking of Polymers of Intrinsic Microporosity (PIMs) for Condensable Gas Separation", Macromolecular Rapid Communications 32:631-636, 2011.

(56) References Cited

OTHER PUBLICATIONS

Du et al., "Decarboxylation-Induced Cross-Linking of Polymers of Intrinsic Microporosity (PIMs) for Membrane Gas Separation", Macromolecules, vol. 45, 12, pp. 5134-5139 (2012).
Du et al., "High-Performance Carboxylated Polymers of Intrinsic Microporosity (PIMs) with Tunable Gas Transport Properties", Macromolecules, vol. 42, 16, pp. 6038-6043 (2009).
European Office Action issued in European Patent Application No. 14872862.9, dated Aug. 2, 2016.
European Office Action issued in European Patent Application No. 14872632.6, dated Aug. 2, 2016.
Falcaro et al., "Patterning Techniques for Metal Organic Frameworks", Adv Mater., 24: 3153-3168, 2012.
Fritsch, D. et al. "High performance organic solvent nanofiltration membranes: Development and thorough testing of thin film composite membranes made of polymers of intrinsic microporosity (PIMs)." Journal of Membrane Science, Elsevier Scientific Publ. Company, vol. 401, pp. 222-231. 2012.
Hasegawa et al., "Selective Oxidation of Carbon Monoxide in Hydrogen-Rich Mixtures by Permeation Through a Platinum-Loaded Y-Type Zeolite Membrane", Journal of Membrane Science 190:1-8, 2001.
Hibshman, C. L. Polyimide-Organosilicate Hybrid Materials. Thesis. Virginia Polytechnic Institute and State University. May 3, 2002.
Hopkins et al., "CF4 Plasma Treatment of Asymmetric Polysulfone Membranes", Langmuir, 12: 3666-3670, 1996.
International Preliminary Report on Patentability for PCT/US2014/070306, mailed Apr. 6, 2016.
International Preliminary Report on Patentability for PCT/US2014/070322, mailed Apr. 6, 2016.
International Search Report and Written Opinion for PCT/US2014/070306, mailed Mar. 26, 2015.
International Search Report and Written Opinion for PCT/US2014/070322, mailed Mar. 31, 2015.
International Search Report and Written Opinion issued in PCT/US2014/070327, dated Mar. 18, 2015.
Kaba et al., "Fluorinated-Plasma Modification of Polyetherimide Films", Journal of Applied Polymer Science, 100: 3579-3588, 2006.
Khan et al., "Cross-linking of Polymer of Intrinsic Microporosity (PIM-1) via nitrene reaction and its effect on gas transport property", accepted manuscript for European Polymer Journal, 2013.
Kramer et al., "Low Temperature Plasma for the Preparation of Separation Membranes", Journal of Membrane Sciences, 46: 1-28, 1989.
Li et al., "Physical aging, high temperature and water vapor permeation studies of UV-rearranged PIM-1 membranes for advanced hydrogen purification and production", International Journal of Hydrogen Energy, vol. 38, 23, p. 9786-93 (2013).
Li, F. Y. et al. "High-Performance Thermally Self-Cross-Linked Polymer of Intrinsic Microporosity (PIM-1) Membranes for Energy Development." Macromolecules. vol. 45, Issue 6, pp. 1427-1437. 2012.
Lin et al., "Gas Permeabilities of Poly(trimethylsilylpropyne) Membranes Surface Modified with CF4 Plasma", Journal of Applied Polymer Science, 48: 231-236, 1993.
Machine Translation of JP 3331153B 2002, pp. 8.
Makhseed et al., "Phthalimide based polymers of intrinsic microporosity", Polymer, vol. 53, 14, pp. 2964-2972 (2012).
Matsuyama et al., "Effect of plasma treatment on CO2 permeability and selectivity of poly(dimethylsiloxane) membrane", Journal of Membrane Science, 99: 139-147, 1995.
McKeown et al., "Exploitation of Intrinsic Microporosity in Polymer-Based Materials", Macromolecules 43:5163-5176, 2010.
Perry "Perry's Chemical Engineers Handbook" 1999 McGraw-Hill, p. 22-38.
Search Report and Written Opinion issued in PCT/US2014/019979, dated Jun. 4, 2014.
Shao et al., "Effect of Plasma. Treatment on the Gas Permeability of Poly(4-methyl-2-pentyne) Membranes", Plasma Processes and Polymers, 4: 823-831, 2007.
Vankelecom, I. F. J. et al. "Incorporation of Zeolites in Polyimide Membranes." Journal of Physical Chemistry. vol. 99, Issue 35, pp. 13187-13192. 1995.
Wavhal "Membrane surface modification by plasma-induced polymerization of acrylamide for improved surface properties and reduced protein fouling", Langmuir, 19: 79-85, 2003.
Yong et al., "High performance PIM-1/Matrimid hollow fiber membranes for CO2/CH4, O2/N2 and CO2/N2 separation", Journal of Membrane Science, vol. 443, pp. 156-169 (2013).
Yong et al., "Highly permeable chemically modified PIM-1/Matrimid membranes for green hydrogen purification", J. Mater. Chem. A 1:13914-13925, 2013.
Yong, W. F. et al. "Molecular engineering of PIM-1/Matrimid blend membranes for gas separation." Journal of Membrane Science, Elsevier, Scientific Publ. Company, vol. 407, pp. 47-57. 2012.
Yu et al., "Surface modification of polypropylene microporous membrane to improve its antifouling property in MBR: CO2 plasma treatment", Journal of Membrane Science 254:219-227, 2005.
Zhang "Synthesis and properties of novel soluble polyimides having a spirobisindane-linked dianhydride unit" Polymer 2007, 48: 2250-2256.

* cited by examiner

H₂N-R-NH₂ =  n=1-100 or branched multiamine or polyethylenimine

R = -NH, O, S
x = 1-20
y = 1-20

R₁, R₂, R₃, R₄ = H, -CH₃, -C₂H₅;

R₁, R₂, R₃, R₄ = H, -CH₃, -C₂H₅;

R₁, R₂, R₃, = H, -CH₃, -C₂H₅;

R₁, R₂, R₃, R₄ = H, -CH₃, -C₂H₅;
R₅ = -CH₂, O, S, -CF₂, -C(CH₃)₂, -CH(CH₃)

TREATED MIXED MATRIX POLYMERIC MEMBRANES

CROSS REFERENCE TO RELATED APPLICATIONS

This application is a national phase application under 35 U.S.C. 371 of International Application No. PCT/US2014/070335, filed Dec. 15, 2014, which claims the benefit to U.S. Provisional Patent Application No. 61/916,629 titled "TREATED MIXED MATRIX POLYMERIC MEMBRANES" filed Dec. 16, 2013. The entire contents of each of the above-referenced disclosures are specifically incorporated herein by reference without disclaimer.

BACKGROUND OF THE INVENTION

A. Field of the Invention

The present invention relates to treated mixed matrix polymeric membranes in which metal-organic frameworks (MOFs) such as zeolitic imidazolate frameworks (ZIFs) are attached to the polymers (e.g., by covalent bonding) such that voids between the interface of the MOFs and polymers are reduced in number or size or both. Further, the membranes can be treated with plasma, electromagnetic radiation, or thermal energy, or any combination thereof. This combination of the attachment of the MOFs to the polymers of the membrane along with the surface treatment of the membranes results in polymeric membranes that have surprisingly improved selectivity parameters for gas separation applications.

B. Description of Related Art

A membrane is a structure that has the ability to separate one or more materials from a liquid, vapor or gas. The membrane acts like a selective barrier by allowing some material to pass through (i.e., the permeate or permeate stream) while preventing others from passing through (i.e., the retentate or retentate stream). This separation property has wide applicability in both the laboratory and industrial settings in instances where it is desirable to separate materials from one another (e.g., removal of nitrogen or oxygen from air, separation of hydrogen from gases like nitrogen and methane, recovery of hydrogen from product streams of ammonia plants, recovery of hydrogen in oil refinery processes, separation of methane from the other components of biogas, enrichment of air by oxygen for medical or metallurgical purposes, enrichment of ullage or headspace by nitrogen in inerting systems designed to prevent fuel tank explosions, removal of water vapor from natural gas and other gases, removal of carbon dioxide from natural gas, removal of $H_2S$ from natural gas, removal of volatile organic liquids (VOL) from air of exhaust streams, desiccation or dehumidification of air, etc.).

Examples of membranes include polymeric membranes such as those made from polymers, liquid membranes (e.g., emulsion liquid membranes, immobilized (supported) liquid membranes, molten salts, etc.), and ceramic membranes made from inorganic materials such as alumina, titanium dioxide, zirconia oxides, glassy materials, etc.

For gas separation applications, the membrane of choice is typically a polymeric membrane. One of the issues facing polymeric membranes, however, is their well-known trade-off between permeability and selectivity as illustrated by Robeson's upper bound curves (Robeson, *J Membr. Sci.* 1991, 62:165; Robeson, *J Membr. Sci.*, 2008, 320:390-400). In particular, there is an upper bound for selectivity of, for example, one gas over another, such that the selectivity decreases with an increase in membrane permeability.

Metal-organic frameworks (MOFs) such as zeolitic imidazolate frameworks (ZIFs) have been previously incorporated into polymeric membranes to create mixed matrix membranes. The purpose of the use of MOFs was to increase the permeability of said membranes. These mixed matrix membranes were prepared by blending ZIFs with polymers, in which no chemical reaction between the ZIFs and the polymers occurred. This allowed for an increase in the permeability of the membranes, due to the poor interaction between the ZIFs and polymers at the polymer-zeolite interface. In particular, non-selective interfacial voids were introduced in the membranes such that the voids allowed for increased permeability but decreased selectivity of given materials. This has been referred to as a "sieve-in-a-cage" morphology (Hillock et al., *Journal of Membrane Science.* 2008, 314:193-199). FIGS. 1A-B illustrate prior art membranes exhibiting "sieve in a cage" morphology (Mahajan, et al., *J Appl. Polym. Sci.,* 2002, 86:881).

Such "sieve-in-a-cage" morphology has resulted in mixed matrix membranes that fail to perform above a given Robeson upper bound trade-off curve. That is, a majority of such membranes fail to surpass the permeability-selectivity tradeoff limitations, thereby making them less efficient and more costly to use. As a result, additional processing steps may be required to obtain the level of gas separation or purity level desired for a given gas.

SUMMARY OF THE INVENTION

A solution to the disadvantages of the currently available mixed matrix polymeric membranes has been discovered. The solution is based on a surprising discovery that the combination of the attachment of metal-organic frameworks (MOFs) to polymers through a chemical bond such as a covalent bond along with treating the polymeric membrane with energy increases the selectivity of the membrane for gas separation applications. In particular instances, the MOFs are first chemically bonded to the polymers (e.g., polyimide (PI) or polyetherimide (PEI)) via functional groups on the MOFs and reactive groups on the polymers. The polymers can then be used to form a membrane or can be blended with other polymers (e.g., polymers of intrinsic microporosity (PIM)) to form a membrane having a polymeric blend. The membrane can then be treated with energy such as from plasma, electromagnetic radiation, or thermal energy. Without wishing to be bound by theory, it is believed that this combination of chemical attachment of the MOFs to the polymers (e.g., MOF with PI or PEI) along with membrane treatment results in a reduction in the size and number of interfacial voids between said MOFs and polymers via modification of the MOF/polymer interface, thereby reducing or avoiding the aforementioned "sieve-in-a-cage" morphology. Further, it is also believed that the energy treatment may change the structure of the MOFs or PIMs such that their respective pore sizes are modified, thereby further contributing to the increased selectivity of the membranes of the present invention. The end result is the production of membranes that have selectivity parameters that can exceed the Robeson's upper bound trade-off curve for a given gas over another gas (e.g., hydrogen over nitrogen, hydrogen over methane, or carbon dioxide over methane).

In one embodiment of the present invention, there is disclosed a treated mixed matrix polymeric membrane comprising a polymeric matrix and a plurality of at least a first metal-organic framework (MOF), wherein the plurality of the first MOFs are attached to the polymeric matrix through covalent or hydrogen bonding or Van der Waals interaction(s), wherein the polymeric membrane has been plasma-treated, treated with electromagnetic radiation, or thermally-treated. Alternatively, the polymers having the attached MOFs can be subjected to said energy treatment and then be used to form the treated membranes (e.g., the polymers can be treated and then be used to form the treated membrane or the polymers can be treated and the formed membrane can also be treated to form the treated membrane). In preferred embodiments, the polymeric matrix can be formed with polyimide polymers, polyetherimide polymers, polymers of intrinsic microporosity (PIM), or copolymers or block polymers thereof. In some instances, the polymeric matrix can be formed with a blend of said polymers (e.g., a blend of a polyimide and a PIM, a blend of a polyimide and a polyetherimide, a blend of a polyetherimide and a PIM, or blend of a polyimide, a PIM, and a polyetherimide). Further, the blend can include other polymers. Non-limiting examples of such polymers are disclosed throughout the specification and incorporated herein by reference. For example, the polyimide polymer can be 6-FDA-Durene or 6FDA-DAM or both. The polyetherimide polymer can be Ultem®), Extem®, or Siltem® (SABIC Innovative Plastics Holding BV) or any combination thereof. The PIM can be PIM-1 or PIM-7 or a combination thereof. In a preferred aspect, the attachment is through a covalent bond, such as a covalent bond being formed between a functional group or linker from the MOFs and a reactive group from the polymers making up the polymeric matrix. Still further, the MOFs can have a single functional group or multiple functional groups (e.g., 2, 3, 4, 5, 6, 7, or more) such that each MOF can have a single attachment or multiple attachments to the polymeric matrix. Even further, the functional groups on each MOF can be the same or can be different functional groups. It is thought that the selectivity of the membranes can be further tuned in this manner by modifying the number of chemical bonds between said MOFs and polymers such that particular membranes can be obtained or tuned for particular applications (e.g., separation of olefins from paraffins, carbon dioxide from natural gas, hydrogen gas from carbon monoxide, etc.). Also, MOFs with functional groups can form covalent bonds and non-covalent bonds (e.g., hydrogen bonds or Van der Waals interactions) with the polymeric matrix. In this sense, while covalent bonding between the MOFs and polymers may be preferred, the MOFs could be attached to the polymers through covalent bonds, hydrogen bonds or Van der Walls interactions or any combination thereof. Therefore, the use of "or" in the previous sentence is intended to encompass embodiments where the attachment of the MOFs to the polymeric matrix are through covalent bonds, hydrogen bonds, or Van der Walls interactions or through any combination thereof such as covalent bonds and hydrogen bonds, covalent bonds and Van der Walls interactions, or covalent bonds, hydrogen bonds, and Van der Walls interactions. Non-limiting examples of functional groups or linkers that can be used on a given MOF include amino or imine groups or combinations of such groups. The amino group can have a generic structure such as

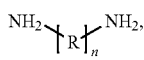

where R can be a linear or branched alkane, and n can be 1 to 100. In particular embodiments, R is $CH_2$ and n is 1 to 5 or 1 to 3 or 2. In other embodiments, the amino group can be:

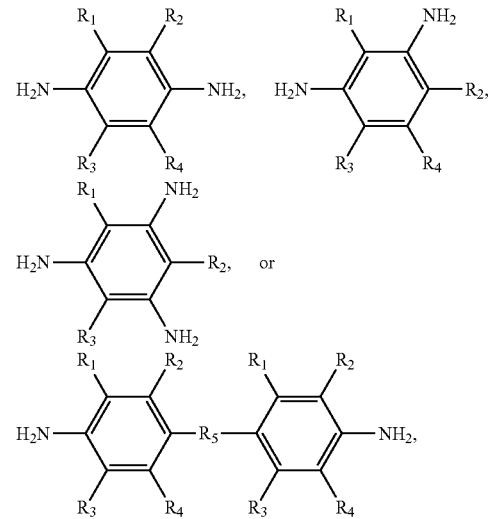

where $R_1$, $R_2$, $R_3$, and $R_4$, are each individually H, —$CH_3$, or —$C_2H_5$, and $R_5$ is $CH_2$, O, S, $CF_2$, —$C(CH_3)_2$, or —$CH(CH_3)$. The imine group can have the following structure:

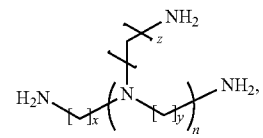

where x is 1 to 20, y is 0 to 20, z is 0 to 20, and n is 0 to 30. The plasma treatment that can be used to treat the membrane (which includes at least a portion of the surface of the membrane) can include a plasma gas comprising a reactive species for 30 seconds to 30 minutes, 30 second to 10 minutes, 1 to 5 minutes, or 2 to 4 minutes. The polymeric membrane (e.g. a portion of the surface or the entire surface of the membrane) can be plasma-treated, treated with electromagnetic radiation (e.g., ultraviolet radiation, microwave radiation, radiation from a laser source, etc.), or treated with thermal energy or heat. The membranes can be treated with any combination of these treatments (e.g., plasma and electromagnetic radiation, plasma and thermal energy, electromagnetic radiation and thermal energy, or each of plasma, electromagnetic radiation, and thermal energy). The combination treatments can be sequential or can overlap with one another. Plasma treatment can include subjecting the membrane to a plasma comprising a reactive species for 30 seconds to 30 minutes, 30 second to 10 minutes, 1 to 5 minutes, or 2 to 4 minutes. The temperature of the plasma treatment can be 15° C. to 80° C. or about 50° C. The plasma gas can include $O_2$, $N_2$, $NH_3$, $CF_4$, $CCl_4$, $C_2F_4$, $C_2F_6$, $C_3F_6$, $C_4F_8$, $Cl_2$, $H_2$, He, Ar, CO, $CO_2$, $CH_4$, $C_2H_6$, $C_3H_8$, or any mixture thereof. In particular embodiments, the reactive gas can include $O_2$ and $CF_4$ at a ratio of up to 1:2. Electromagnetic treatment can include subjecting the membrane to such radiation for 30 to 500 minutes or from 60 to 500 minutes or from 90 to 480 minutes or from 120 to 240 minutes. Thermal treatment can include subjecting the membranes to temperatures of 100 to 400° C. or from 200 to 350° C. or from 250 to 350° C. for 12 to 96 hours or 24 to 96 hours or 36 to 96 hours. In one particular embodiment, the membranes can be subjected to ultraviolet (UV) treatment for 4 hours, 5 hours, 8 hours, 10 hours or 4 to 8 hours at 15° C. to 80° C. or about 25° C. In particular aspects, the plurality of the first MOFs are zeolitic imidazolate frameworks (ZIFs), and the functional group is on an imidazolate ligand of the first ZIFs. In one instance, the imidazolate ligand is an imidazole carboxyaldehyde ligand that has been functionalized with an amino group or an imine group. In some aspects, the first ZIFs can include (1) an imidazole carboxyaldehyde ligand that has been functionalized with an amino group and (2) a methyl imidazole ligand. Non-limiting examples of MOFs and ZIFs include isoreticular metal-organic framework-3 (IRMOF-3), ZIF-8-90 or ZIF-8-90-EDA. The membranes can include a plurality of first, second, third, fourth, fifth, etc. MOFs such that a mixture of different MOFs (or a mixture of MOFs and ZIFs or a mixture of ZIFs) can be used in a given membrane or such that a single type or species of MOF can be used in a given membrane. Further, more than one functional group may be introduced into the MOFs. In particular instances, the MOFs are functionalized with at least 2, 3, 4, 5, 6, 7, 8, 9, or 10 functional groups. The pore size of the MOFs or ZIFs can be tuned to the desired size by modifying the ratio of the imidazolate ligands and the functional groups introduced into the ZIFs. In some instances, the pore size will be in a range from 0.1 nm to 5 nm. In some instances, the pore size will be 0.1, 0.2, 0.3, 0.4, 0.5, 0.6, 0.7, 0.8, 0.9, 1, 1.5, 2, 2.5, 3, 2.5, 4, 4.5, or 5 nm. The two different ligands can be mixed in any ratio to synthesize hybrid MOFs and ZIFs, and the ratio of functionalized ligand can be 1-99% mole percent of functional groups, depending on the desired selectivity of the membrane. Such membranes may include ZIFs comprising 60, 65, 70, 75, 80, 85, or 90 mole percent (i.e., mole fraction) of imidazolate ligands and 15, 20, 25, 30, or 35 mole percent of functional groups, depending on the desired selectivity of the membrane. In some instances, the ZIFs may comprise Zn, Cu, Co, or Fe, or any combination thereof and, in some instances, comprise a methyl imidazole carboxyaldehyde ligand, a methyl imidazole ligand, or a combination thereof. The plurality of MOFs may be comprised of all one MOF or different MOFs, or a combination of ZIFs and non-ZIF MOFs, and the mixed matrix membrane may comprise any appropriate concentration of MOFs, such as from 5% to 90% by mole. In some embodiments, the mixed matrix membranes can be void-free (i.e., the membranes do not include non-selective interfacial voids between the polymers of the membrane and the MOFs), substantially void-free (i.e., the size of the majority or all of the voids between the polymers of the membrane and the MOFs are less than or equal to five Angstroms in diameter), or do not have a "sieve-in-a-cage morphology." The membrane can be in the form of a thin film, flat sheet membrane, a spiral membrane, a tubular membrane, or a hollow fiber membrane. Additionally, the membranes disclosed herein have excellent permeability properties for a wide range of gases (e.g., $N_2$, $H_2$, $CO_2$, $CH_4$, $C_2H_4$, $C_2H_6$, $C_3H_6$, and $C_3H_8$) as well as selectivity performance (e.g., $C_3H_6/C_3H_8$, $C_2H_4/C_2H_6$, ($C_2H_6/C_3H_8$, $H_2/C_3H_8$, $H_2/N_2$, $H_2/C_3H_8$, $H_2/CH_4$, $CO_2/C_3H_8$, $CO_2/CH_4$, $CO_2/C_2H_4$, $N_2/CH_4$, $N_2/C_3H_8$, and $CO_2/N_2$). These permeability parameters can be further leveraged in that the faster or slower a gas moves through a particular membrane, the better selectivity can be created for a given pair of gases. Non-limiting examples of these permeability and selectivity properties of various membranes of the present invention are provided in the Examples, which are incorporated into this section by reference.

Also disclosed are processes of using the compositions and membranes disclosed throughout this specification. In one instance, the process can be used to separate two materials, gases, liquids, compounds, etc. from one another. Such a process can include contacting a mixture or composition having the materials to be separated on a first side of the composition or membrane, such that at least a first material is retained on the first side in the form of a retentate and at least a second material is permeated through the composition or membrane to a second side in the form of a permeate. In this sense, the composition or method could include opposing sides, wherein one side is the retentate side and the opposing side is the permeate side. The feed pressure of the mixture to the membrane or the pressure at which the mixture is fed to the membrane can be 1, 2, 3, 4, 5, 6, 7, 8, 9, 10, 11, 12, 13, 14, 15, 16, 17, 18, 19 and 20 atmosphere (atm) or more or can range from 1 to 20 atm, 2 to 15 atm, or from 2 to 10 atm. Further the temperature during the separation step can be 20, 25, 30, 35, 40, 45, 50, 55, 60, or 65° C. or more or can range from 20 to 65° C. or from 25 to 65° C. or from 20 to 30° C. The process can further include removing or isolating either or both of the retentate and/or the permeate from the composition or membrane. The retentate and/or the permeate can be subjected to further processing steps such as a further purification step (e.g., column chromatography, additional membrane separation steps, etc.). In particular instances, the process can be directed to removing at least one of $N_2$, $H_2$, $CH_4$, $CO_2$, $C_2H_4$, $C_2H_6$, $C_3H_6$, and/or $C_3H_8$ from a mixture. In preferred aspects, the method can be used to separate hydrogen gas from a mixture comprising hydrogen gas and nitrogen gas, or hydrogen gas from a mixture comprising hydrogen gas and methane gas, or carbon dioxide gas from a mixture comprising carbon dioxide gas and methane gas. The membranes can be used in gas separation (GS) processes, vapor permeation (VP) processes, pervaporation (PV) processes, membrane distillation (MD) processes, membrane contactors (MC) processes, and carrier mediated processes, sorbent PSA (pressure swing absorption), etc. Further, it is contemplated that at least 2, 3, 4, 5, or more of the same or different membranes disclosed herein can be used in series with one another to further purify or isolate a targeted liquid, vapor, or gas material. Similarly, the membranes disclosed herein can be used in series with other currently known membranes to purify or isolate a targeted material.

In another embodiment of the present invention there is disclosed a method of preparing any one of the treated mixed matrix polymeric membranes discussed above. The method can include the following steps: (a) obtaining a plurality of at least the first MOFs comprising at least one functional group; (b) attaching the plurality of the first MOFs to a polymer or a polymer blend via a covalent or hydrogen bond or Van der Waals interaction; (c) forming a polymeric membrane comprising a polymeric matrix with the polymer or polymeric blend from step (b); and (d) subjecting at least a portion of the surface of the formed polymeric membrane to plasma, electromagnetic radiation, or thermal treatment, or any combination thereof. Alternatively, the polymers having the attached MOFs can be subjected to said energy treatment and then be used to form the treated membranes (e.g., the polymers can be treated and then be used to form the treated membrane or the polymers can be treated and the formed membrane can also be treated to form the treated membrane). In this sense, step (d) can be removed and a step (b1) added in which the MOF/polymer from step (b) is subjected to said energy treatment prior to step (c), or step (b1) can be used in combination with step (d). In particular aspects, the MOFs can be ZIFs. The MOFs/ZIFs can be attached to the polymeric matrix through covalent bonds formed between the matrix and the functional group(s) of the MOFs/ZIFs. For example, the attachment can be through a covalent bond, such as a covalent bond being formed between a functional group or linker from the MOFs and a reactive group from the polymers making up the polymeric matrix. Still further, the MOFs can have a single functional group or multiple functional groups (e.g., 2, 3, 4, 5, 6, 7, or more) such that each MOF can have a single attachment or multiple attachments to the polymeric matrix. Even further, the functional groups on each MOF can be the same or can be different functional groups. Also, MOFs with functional groups can form covalent bonds and non-covalent bonds (e.g., hydrogen bonds or Van der Waals interactions) with the polymeric matrix. Also, and as discussed above, the membranes can be treated with any combination of these treatments (e.g., plasma and electromagnetic radiation, plasma and thermal energy, electromagnetic radiation and thermal energy, or each of plasma, electromagnetic radiation, and thermal energy). The combination treatments can be sequential or can overlap with one another. Plasma treatment can include subjecting the membrane to a plasma comprising a reactive species for 30 seconds to 30 minutes, 30 second to 10 minutes, 1 to 5 minutes, or 2 to 4 minutes. The temperature of the plasma treatment can be 15° C. to 80° C. or about 50° C. The plasma gas can include $O_2$, $N_2$, $NH_3$, $CF_4$, $CCl_4$, $C_2F_4$, $C_2F_6$, $C_3F_6$, $C_4F_8$, $Cl_2$, $H_2$, He, Ar, CO, $CO_2$, $CH_4$, $C_2H_6$, $C_3H_8$, or any mixture thereof. In particular embodiments, the reactive gas can include $O_2$ and $CF_4$ at a ratio of up to 1:2. Electromagnetic treatment can include subjecting the membrane to such radiation for 30 to 500 minutes or from 60 to 300 minutes or from 90 to 240 minutes or from 120 to 240 minutes. Thermal treatment can include subjecting the membranes to temperatures of 100 to 400° C. or from 200 to 350° C. or from 250 to 350° C. for 12 to 96 hours or 24 to 96 hours or 36 to 96 hours.

Also disclosed is a gas separation device comprising any one of the polymeric membranes of the present invention. The gas separation device can include an inlet configured to accept feed material, a first outlet configured to expel a retentate, and a second outlet configured to expel a permeate. The device can be configured to be pressurized so as to push feed material through the inlet, retentate through the first outlet, and permeate through the second outlet. The device can be configured to house and utilize flat sheet membranes, spiral membranes, tubular membranes, or hollow fiber membranes of the present invention.

The terms "about," "approximately," and "substantially" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The membranes, ingredients, components, compositions, or methods disclosed herein can "comprise," "consist essentially of," or "consist of" particular method steps, ingredients, components, compositions, etc. disclosed throughout the specification. With respect to the transitional phase "consisting essentially of," in one non-limiting aspect, a basic and novel characteristic of the membranes disclosed herein are their improved selectivity parameters through the reduction of voids between the polymers and MOFs of the mixed matrix membranes.

Other objects, features and advantages disclosed herein will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

Figure 1A:
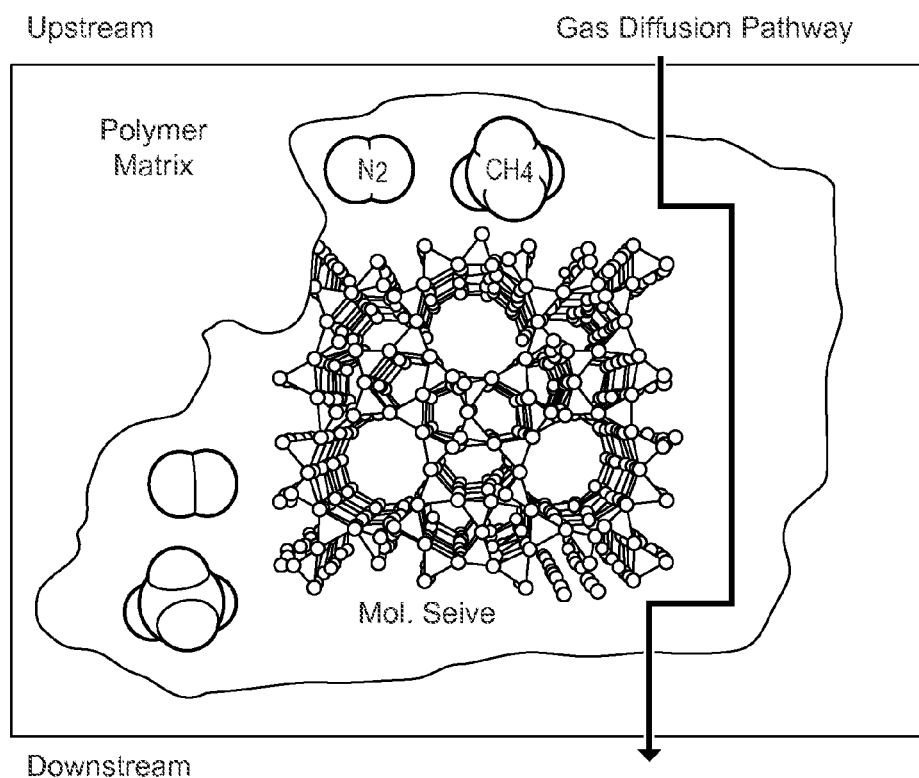
FIGS. 1A-B: (A) Schematic representation of an undesirable gap between the polymer matrix and the molecular sieve insert, commonly referred to as "sieve in a cage" morphology. (B) SEM of zeolite particles exhibiting "sieve-in-a-cage" morphology (Mahajan, et al., 2002).
Figure 1B:
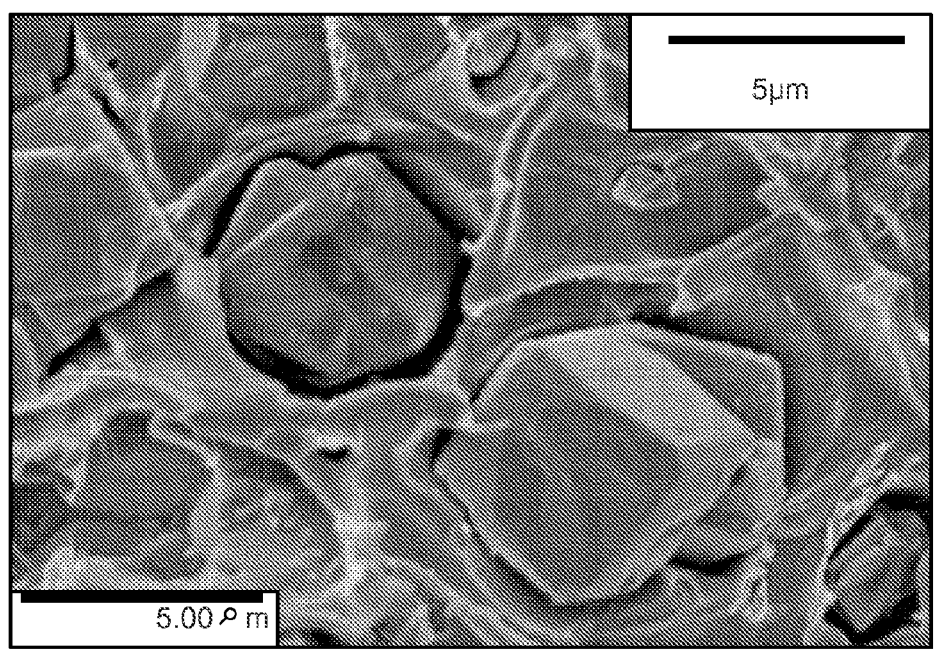

Currently available mixed matrix polymeric membranes that include MOFs do not have sufficient permeability/ selectivity properties. This leads to performance and cost inefficiencies when using such membranes in applications such as gas separation applications.

As discussed above, the mixed matrix membranes of the present invention provide a solution to such performance issues. This solution is based on increasing the interaction between the MOFs and polymers such that voids between the MOF/polymer interface of the produced membrane are reduced in size or number or both, thereby increasing the selectivity of the membranes. Further, the energy treatment may change the structure of the MOFs or PIMs such that their respective pore sizes are modified, thereby further contributing to the increased selectivity of the membranes of the present invention. In preferred aspects, the interaction between the MOFs and polymers are increased through the formation of covalent bonds between the MOFs and polymers combined with plasma, electromagnetic, or thermal treatment (or any combination of such treatments or all of such treatments) of the membranes. However, and as discussed above, it is contemplated that other interactions such as hydrogen bonding or Van der Walls interactions can be used. Still further, the pores of the MOFs can be modified as needed to further tune the selectivity of the membranes of the present invention (e.g., such tuning can be achieved by adjusting the ratio of ligands to functional groups within the MOFs).

The mixed matrix membranes can be used across a wide range of processes such as gas separation (GS) processes, vapor permeation (VP) processes, pervaporation (PV) processes, membrane distillation (MD) processes, membrane contactors (MC) processes, and carrier mediated processes. In certain instances, it has been discovered that the membranes function particularly well in gas separation applications such as separating hydrogen from nitrogen, separating hydrogen from methane, or separating carbon dioxide from methane.

These and other non-limiting aspects of the present invention are discussed in the following subsections.

A. Metal-Organic Frameworks

MOFs are compounds having metal ions or clusters coordinated to organic molecules to form one-, two-, or three-dimensional structures that can be porous. By themselves, MOFs have been demonstrated to have very high gas sorption capacities, which suggest that gases generally will diffuse readily through MOFs if incorporated into a membrane. However, it has been discovered that MOFs attached to a polymeric membrane via covalent or hydrogen bonding or Van der Waals interaction(s) in combination with treating said membrane with plasma, electromagnetic radiation, or thermal energy creates membranes that improve on the permeability and selectivity parameters by virtue of being void-free or substantially void-free, where either no voids or voids of less than several Angstroms are present at the interface of the polymers and the MOFs.

In general, it is possible to tune the properties of MOFs for specific applications using methods such as chemical or structural modifications. One approach for chemically modifying a MOF is to use a linker that has a pendant functional group for post-synthesis modification.

Any MOF either containing an appropriate functional group or that can be functionalized in the manner described herein can be used in the disclosed membranes. Examples include, but are not limited to, IRMOF-3, MOF-69A, MOF-69B, MOF-69C, MOF-70, MOF-71, MOF-73, MOF-74, MOF-75, MOF-76, MOF-77, MOF-78, MOF-79, MOF-80, DMOF-1-$NH_2$, UMCM-1-$NH_2$, and MOF-69-80 (Wang & Cohen, *Chem Soc Rev.* 2009, 38(5):1315-29; Rosi, et al., *J Am Chem Soc.*, 2005, 127(5):1504-18).

In some embodiments, the MOFs are zeolitic imidazolate frameworks (ZIFs). ZIFs are a subclass or species of MOFs which have ordered porous structures with hybrid frameworks consisting of $MN_4$ (M=Co, Cu, Zn, etc.) clusters coordinated with organic imidazolate ligands (Banerjee, et al., *Science.*, 2008, 319:939-943). Similar to other ordered porous materials like zeolites, the regular ZIF structure can be utilized in membrane related applications such as separations, membrane reactors, and chemical sensors. ZIFs have attractive properties such as high specific surface area, high stability, and chemically flexible framework that can be modified with functional groups by post-synthesis methods (Hayashi, et al., 2006; Park, et al., *PNAS*, 2006, 103:10186-10191; Venna, et al., *J Am Chem Soc.*, 2010, 132:76-78; Banerjee, et al., *J Am Chem Soc.*, 2009, 131:3875-3877; Morris, et al., *J. Am Chem Soc.*, 2008, 130:12626-12627). Pure ZIF membranes have high performance at gas separation (Pan, et al., *Journal of Membrane Science*, 2012, 390-391:93-98, and 421-422:292-298), but their applications are limited by high preparation cost. The synthesis and characterization of hybrid ZIFs with mixed linkers in the framework are described in Thompson, et al., *Chem Mater,* 2012, 24:1930. A description of one type of ZIFs and their use and preparation is described for example in US Patent Application No. 2010/0186588, International Patent Application No. WO 2007/0202038, International Patent Application No. WO 2008/140788, International Patent Application No. WO 2012/112122, International Patent Application No. WO 2012/159224, Zhang, et al., *Journal of Membrane Science*, 2012, 389:34-42, and Askari, et al., *Journal of Membrane Science*, 2013, 444:173-183. For instance, a ZIF, can be synthesized by using solvothermal methods. Highly crystalline materials were obtained by combining the requisite hydrated metal salt (e.g., nitrate) and imidazole-type linker in an amide solvent such as N,N-diethylformamide (DEF). The resulting solutions were heated (85-150° C.) and zeolitic frameworks of the disclosure are precipitated after 48-96 h and readily isolated. In a further aspect, the imidazolate structures or derivatives can be further functionalized to impart functional groups that line the cages and channel, and particularly the pores to obtain a desired structure or pore size.

Figure 2:
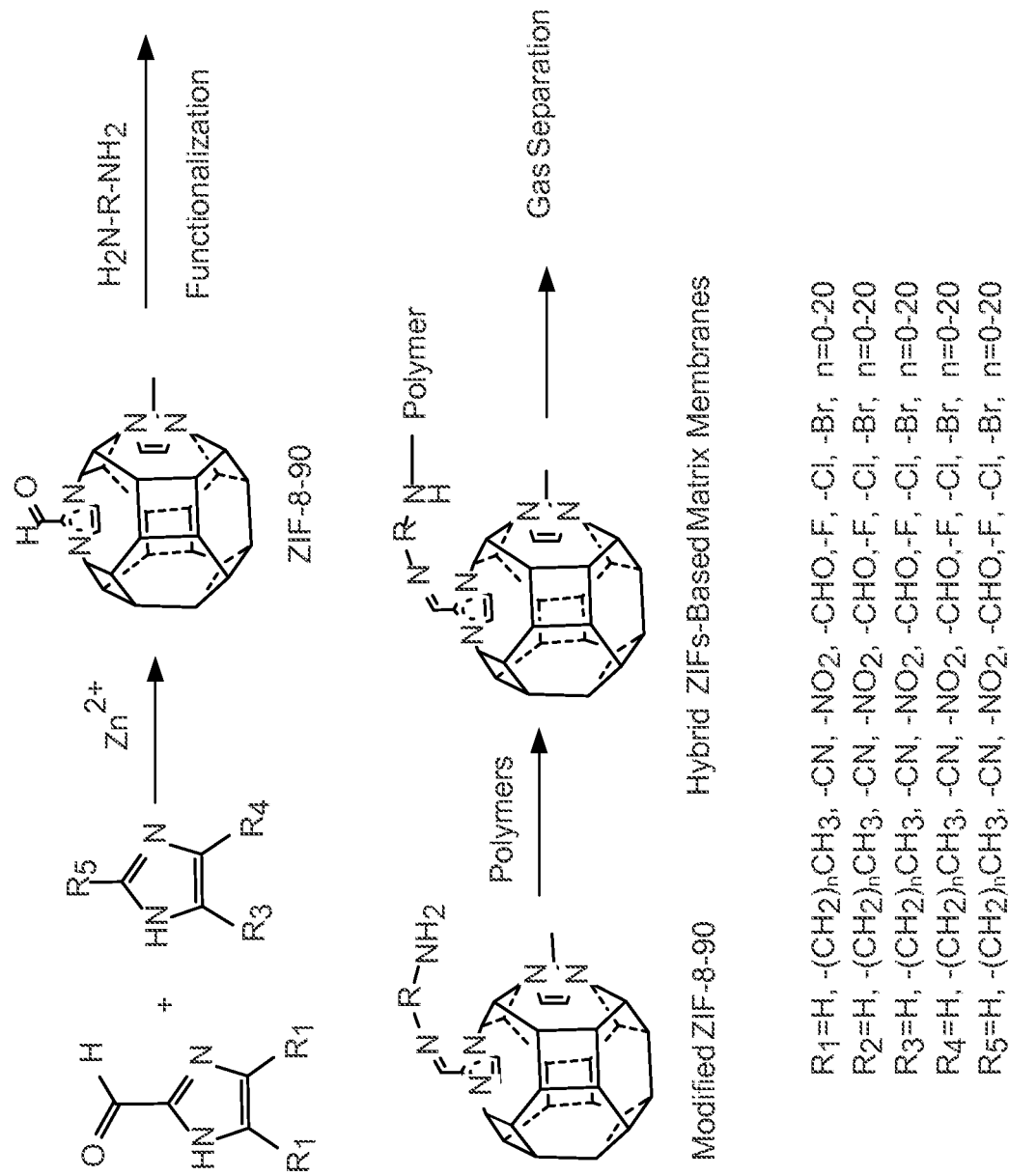
FIG. 2: Preparation of hybrid ZIFs-based mixed matrix membranes.

In some aspects, the hybridized zeolitic imidazolate frameworks are synthesized from zinc salts and mixed imidazole ligands. In particular aspects, the hybrid ZIF-8-90 is used. The hybrid ZIF-8-90 is synthesized via $Zn(NO_3)_2 \cdot 6H_2O$ co-ordinate with mixed ligands carboxaldehyde-2-imidazole and 2-methylimidazole, in which the carboxaldehyde group can react with amino compounds. FIG. 2 illustrates the synthesis of the hybrid ZIF-8-90, which has the following structure:

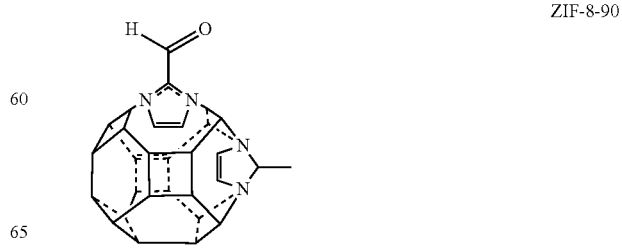

ZIF-8-90

The ZIFs are synthesized from the below imidazole ligands, but are not limited to, at least two kinds of imidazole ligands. At least one ligand can be functionalized. Other ZIFs that may be used include, but are not limited to, the following ZIFs:

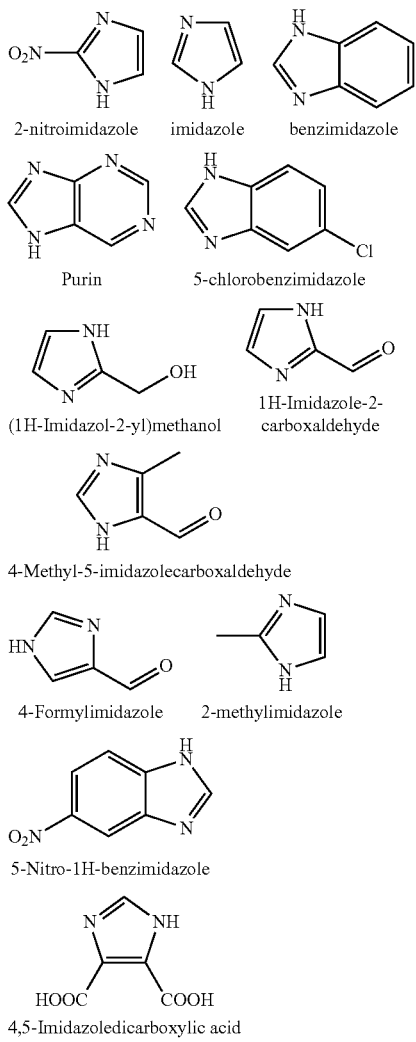

B. Polymers

Non-limiting examples of polymers that can be used in the context of the present invention include polymers of intrinsic microporosity (PIMs), polyetherimide (PEI) polymers, polyetherimide-siloxane (PEI-Si) polymers, and polyimide (PI) polymers. As noted above, the membranes can include a blend of any one of these polymers (including blends of a single class of polymers and blends of different classes of polymers).

1. Polymers of Intrinsic Microporosity

PIMs are typically characterized as having repeat units of dibenzodioxane-based ladder-type structures combined with sites of contortion, which may be those having spiro-centers or severe steric hindrance. The structures of PIMs prevent dense chain packing, causing considerably large accessible surface areas and high gas permeability. The structure of PIM-1, which was used in the Examples, is provided below:

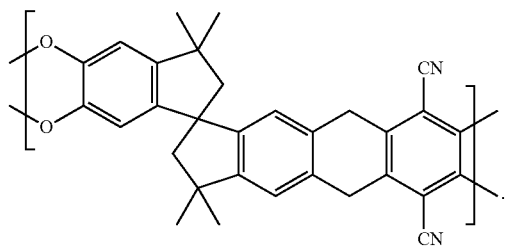

The molecular weight of said polymers can be varied as desired by increasing or decreasing the length of said polymers. PIM-1 can be synthesized as follows:

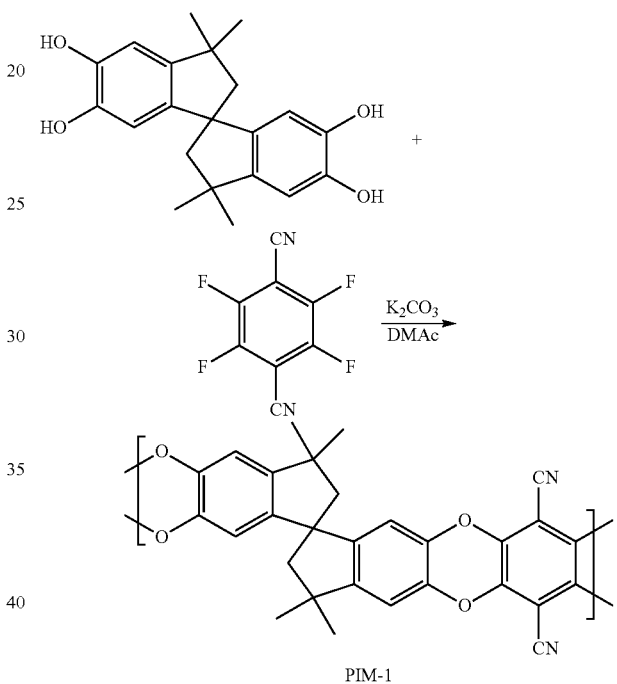

Additional PIMs that can be used in the context of the present invention have the following repeating units:

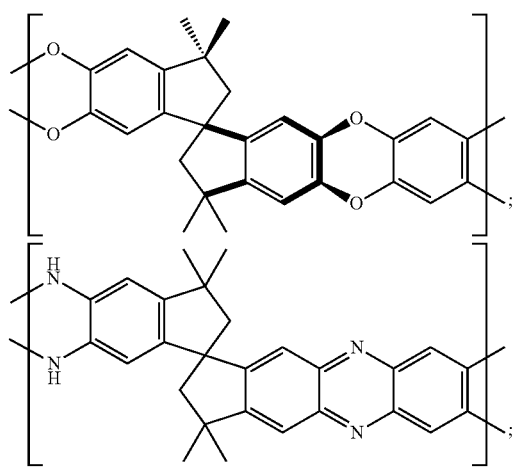

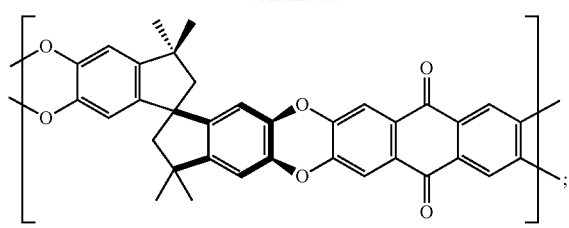
or
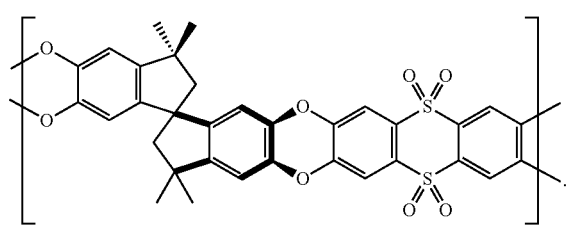
In some instances, the PIM polymers can be prepared using the following reaction scheme:
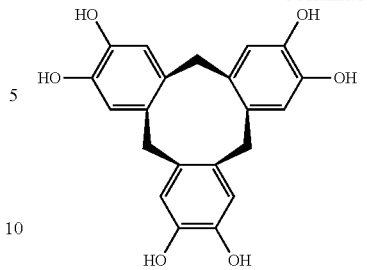
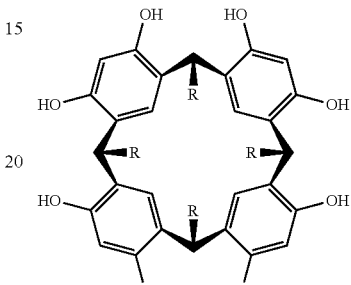
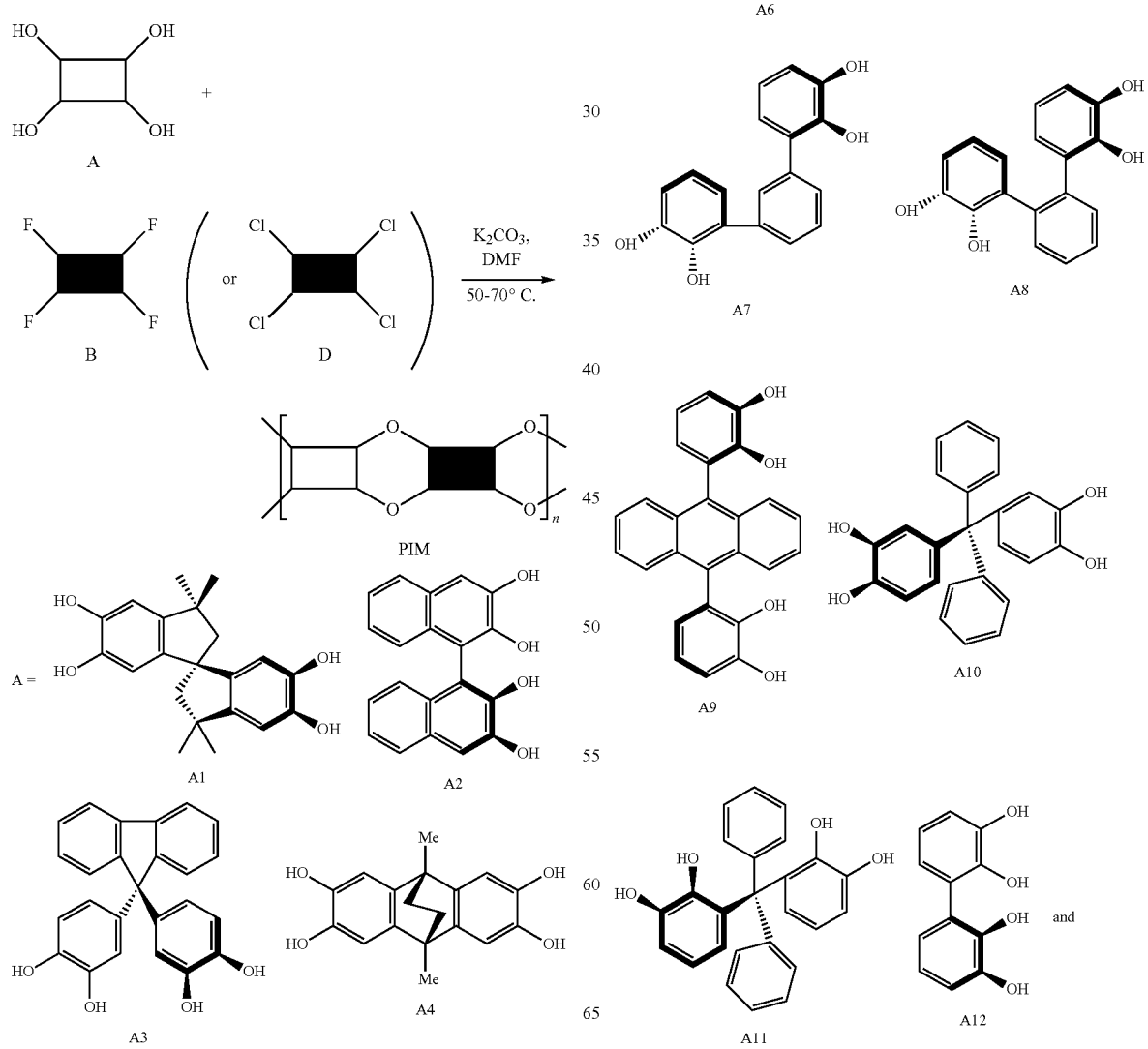

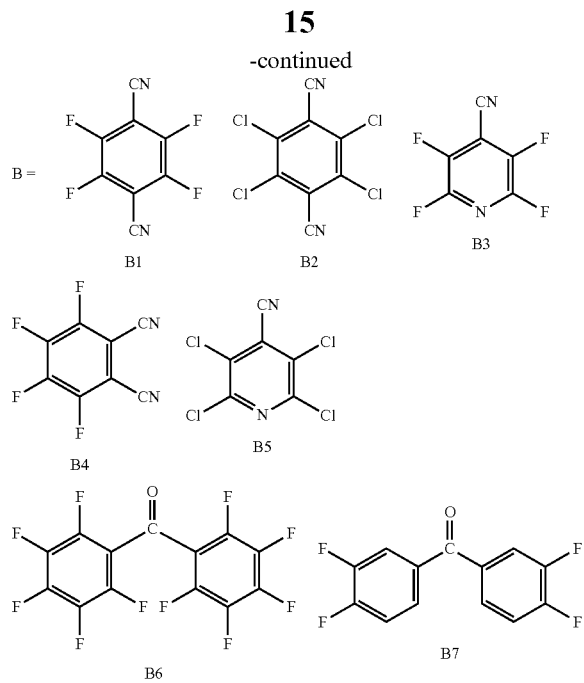
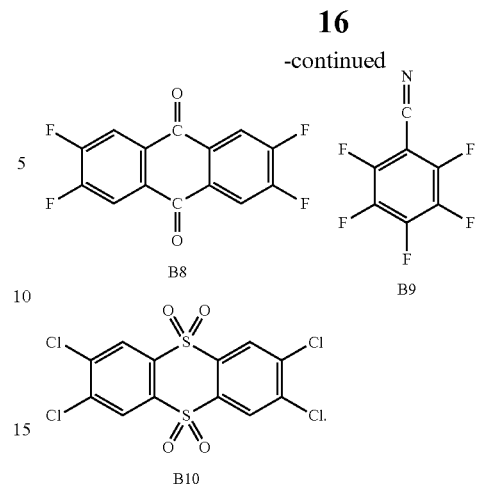

The above structures can further be substituted as desired.

An additional set of PIM polymers that can be used with the blended polymeric membranes of the present invention include the PIM-PI set of polymers disclosed in Ghanem et. al., High-Performance Membranes from Polyimides with Intrinsic Microporosity, *Adv. Mater.* 2008, 20, 2766-2771. The structures of these PIM-PI polymers are:

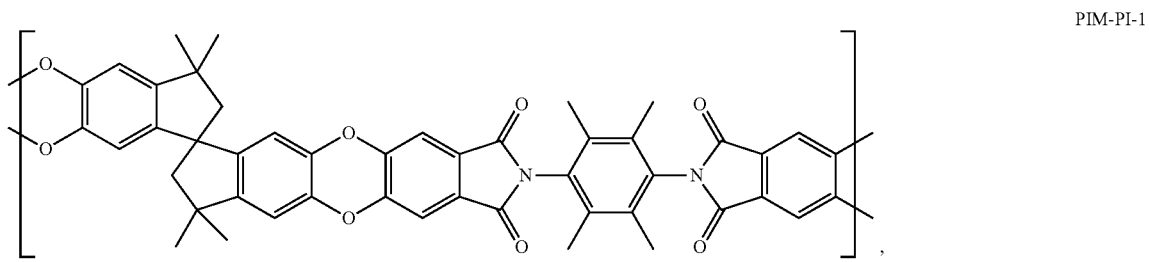

PIM-PI-1

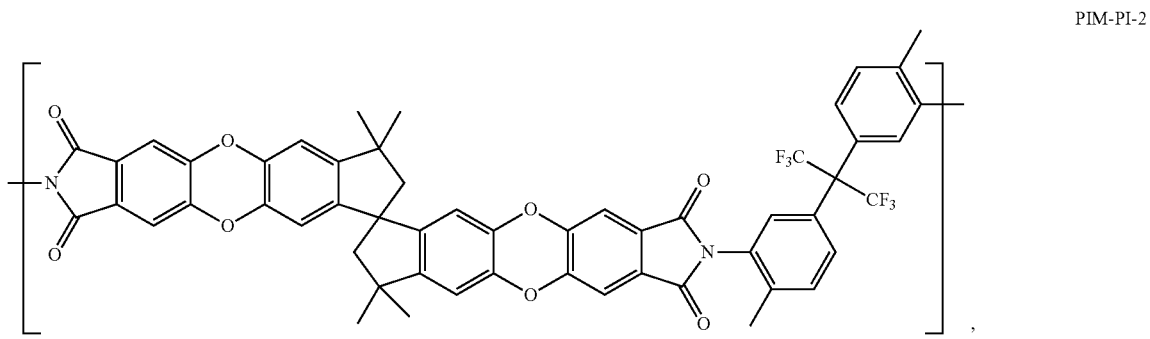

PIM-PI-2

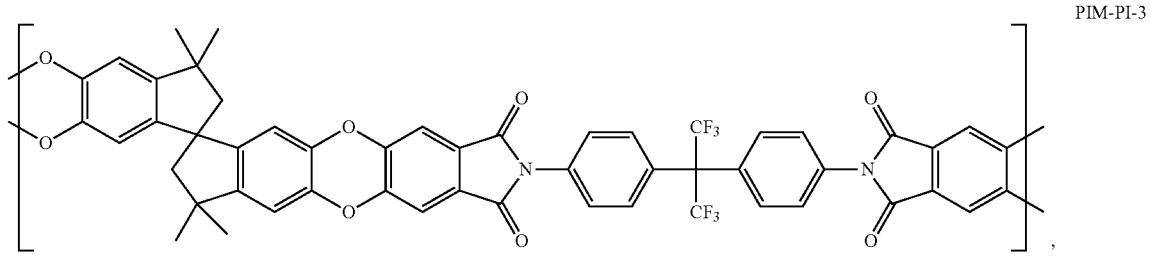

PIM-PI-3

-continued

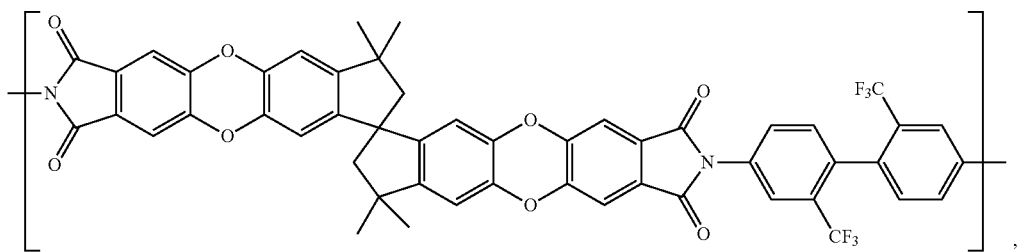
PIM-PI-4

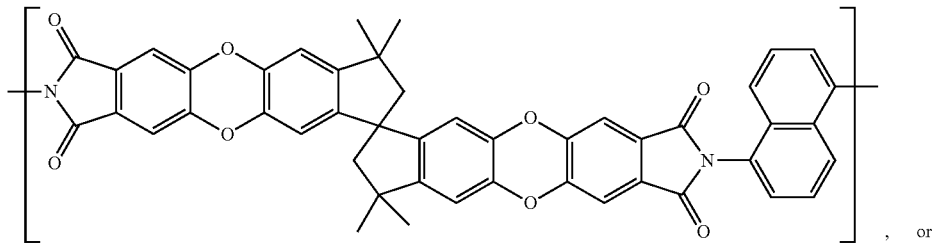
PIM-PI-7, or

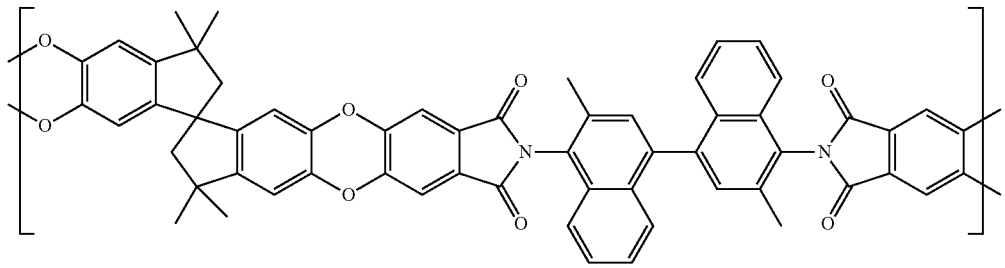
PIM-PI-8

Additional PIMs and examples of how to make and use such PIMs are provided in U.S. Pat. No. 7,758,751 and U.S. Patent Application Publication No. 2012/0264589.

2. Polyetherimide and Polyetherimide-Siloxane Polymers

Polyetherimide polymers that can be used in the context of the present invention generally conform to the following monomeric repeating structure:

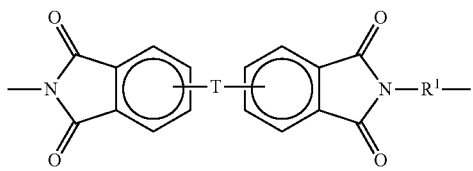

where T and $R^1$ can be varied to create a wide range of usable PEI polymers. $R^1$ can include substituted or unsubstituted divalent organic groups such as: (a) aromatic hydrocarbon groups having 6 to 24 carbon atoms and halogenated derivatives thereof; (b) straight or branched chain alkylene groups having 2 to 20 carbon atoms; (c) cycloalkylene groups having 3 to 24 carbon atoms, or (d) divalent groups of formula (2) defined below. T can be —O— or a group of the formula —O—Z—O— wherein the divalent bonds of the —O— or the —O—Z—O— group are in the 3,3', 3,4', 4,3', or the 4,4' positions. Z can include substituted or unsubstituted divalent organic groups such as: (a) aromatic hydrocarbon groups having about 6 to about 20 carbon atoms and halogenated derivatives thereof; (b) straight or branched chain alkylene groups having about 2 to about 20 carbon atoms; (c) cycloalkylene groups having about 3 to about 20 carbon atoms, or (d) divalent groups of the general formula (2);

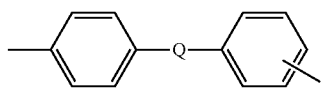

wherein Q can be a divalent moiety selected from the group consisting of —O—, —S—, —C(O)—, —SO$_2$—, —SO—, —C$_y$H$_{2y}$— (y being an integer from 1 to 8), and fluorinated derivatives thereof, including perfluoroalkylene groups. Z may comprise exemplary divalent groups of formula (3)

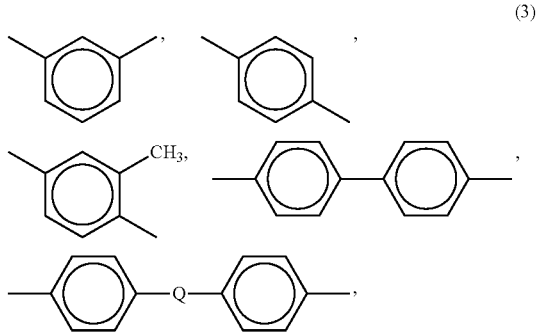

(3)

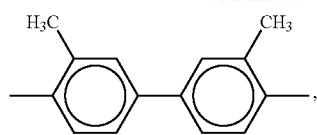

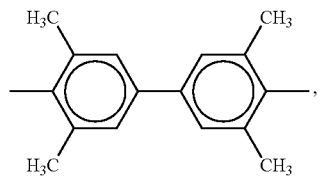

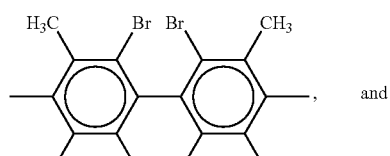 and

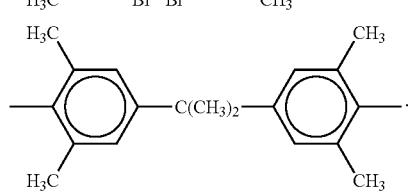

In particular instances, $R^1$ can be as defined in U.S. Pat. No. 8,034,857, which is incorporated into the present application by reference.

Non-limiting examples of specific PEIs that can be used (and that were used in the Examples) include those commercially available from SABIC Innovative Plastics Holding BV (e.g., Ultem® and Extem®). All various grades of Extem® and Ultem® are contemplated as being useful in the context of the present invention (e.g., Extem® (VH1003). Extem® (XH1005), and Extem® (XH1015)).

Polyetherimide siloxane (PEI-Si) polymers can be also used in the context of the present invention. Examples of polyetherimide siloxane polymers are described in U.S. Pat. No. 5,095,060, which is incorporated by reference. A non-limiting example of a specific PEI-Si that can be used include those commercially available from SABIC Innovative Plastics Holding BV (e.g., Siltem®). All various grades of Siltem® are contemplated as being useful in the context of the present invention (e.g., Siltem® (1700) and Siltem® (1500)).

3. Polyimide Polymers

Polyimide (PI) polymers are polymers of imide monomers. The general monomeric structure of an imide is:

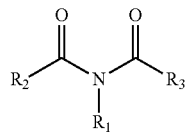

Polymers of imides generally take one of two forms: heterocyclic and linear forms. The structures of each are:

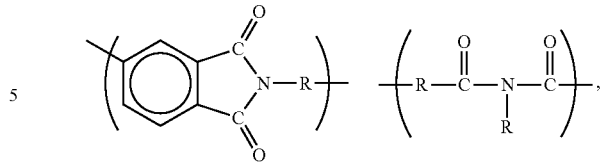

where R can be varied to create a wide range of usable PI polymers. A non-limiting example of a specific PI (i.e., 6FDA-Durene) that can be used is described in the following reaction scheme:

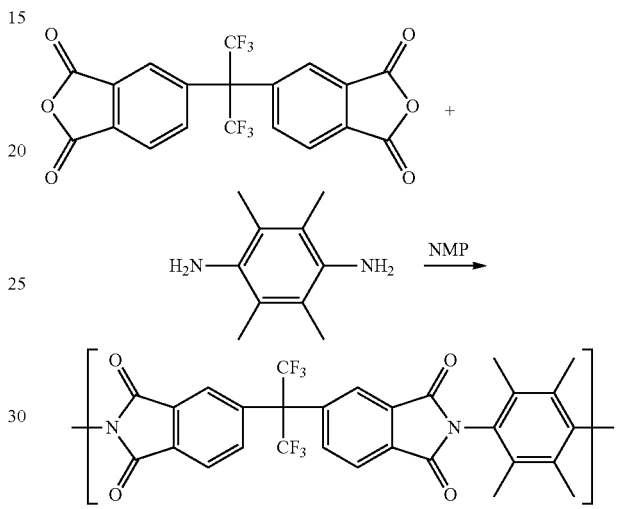

Additional PI polymers that can be used in the context of the present invention are described in U.S. Publication 2012/0276300, which is incorporated by reference. For instance, such PI polymers include both UV crosslinkable functional groups and pendent hydroxy functional groups: poly[3,3',4,4'-benzophenonetetracarboxylic dianhydride-2,2-bis(3-amino-4-hydroxyphenyl)-hexafluoropropane](poly (BTDA-APAF)), poly[4,4'-oxydiphthalic anhydride-2,2-bis (3-amino-4-hydroxyphenyl)-hexafluoropropane](poly (ODPA-APAF)), poly(3,3',4,4'-benzophenonetetracarboxylic dianhydride-3,3'-dihydroxy-4,4'-diamino-biphenyl) (poly(BTDA-HAB)), poly[3,3',4,4'-diphenylsulfone tetracarboxylic dianhydride-2,2-bis(3-amino-4-hydroxyphenyl)-hexafluoropropane](poly(DSDA-APAF)), poly(3,3',4,4'-diphenylsulfone tetracarboxylic dianhydride-2,2-bis(3-amino-4-hydroxyphenyl)-hexafluoropropane-3,3'-dihydroxy-4,4'-diamino-biphenyl) (poly (DSDA-APAF-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane](poly(6FDA-BTDA-APAF)), poly [4,4'-oxydiphthalic anhydride-2,2-bis(3-amino-4-hydroxyphenyl)-hexafluoropropane-3,3'-dihydroxy-4,4'-diamino-biphenyl](poly(ODPA-APAF-HAB)), poly[3,3',4, 4'-benzophenonetetracarboxylic dianhydride-2,2-bis(3-amino-4-hydroxyphenyl)-hexafluoropropane-3,3'-dihydroxy-4,4'-diamino-biphenyl](poly(BTDA-APAF-HAB)), and poly(4,4'-bisphenol A dianhydride-3,3',4,4'-benzophenonetetracarboxylic dianhydride-2,2-bis(3-amino-4-hydroxyphenyl)-hexafluoropropane] (poly(BPADA-BTDA-APAF)). More generically, the PI polymers can have the following formula (I):

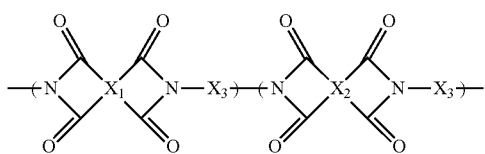

where the length of the polymer or "n" is typically greater than 1 or greater than 5 and typically from 10 to 10,000 or from 10 to 1000 or from 10 to 500, where —$X_1$— of said formula (I) is

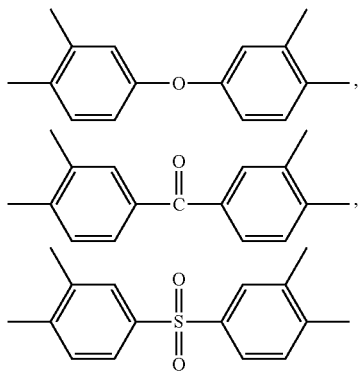

or mixtures thereof, —$X_2$— of said formula (I) is either the same as —$X_1$— or is selected from

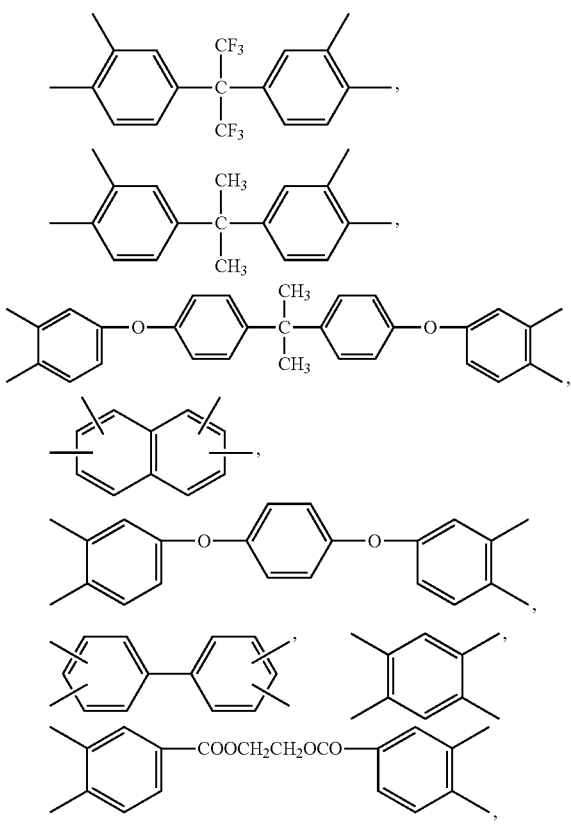

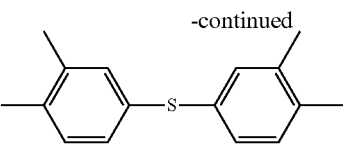

or mixtures thereof, —$X_3$— of said formula (I) is

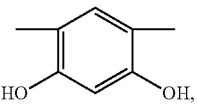

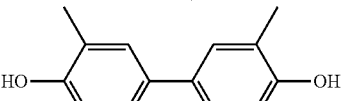

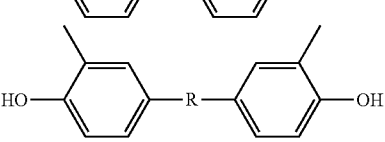

or mixtures thereof, —R— is

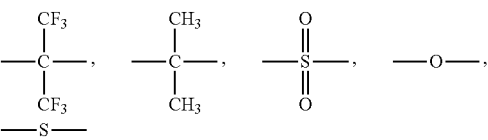

or mixtures thereof.

C. Preparing the Mixed Matrix Polymeric Membranes

1. Functionalizing and Tuning of MOFs

Figure 3:
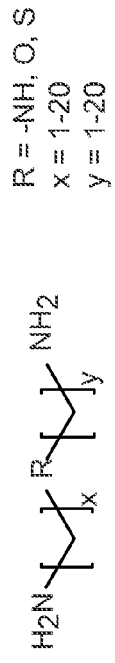
FIG. 3: Linkers between polymers and ZIFs.
Figure 3:
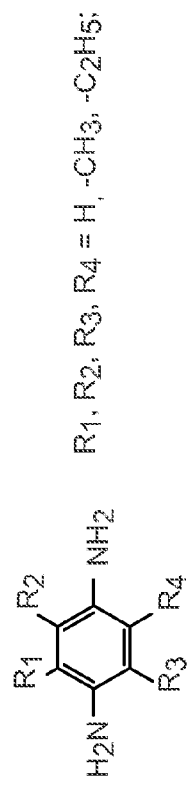
Figure 3:
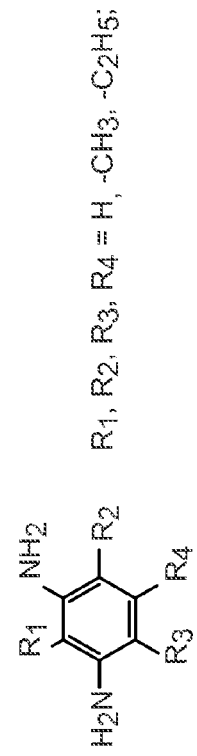
Figure 3:
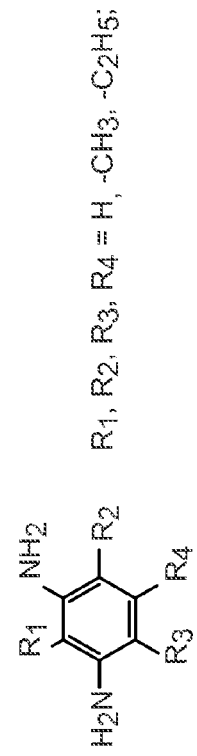
Figure 3:
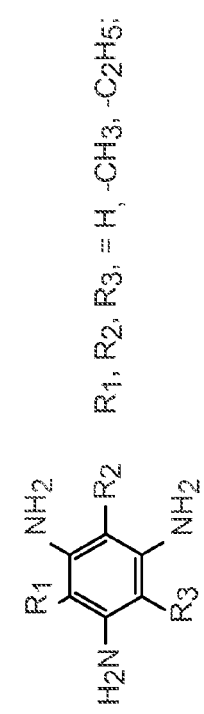
Figure 3:
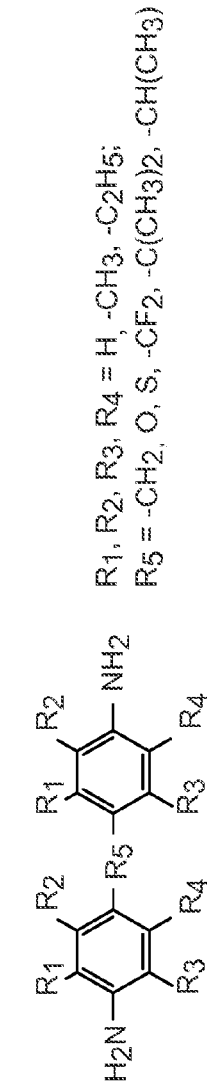
Figure 4:
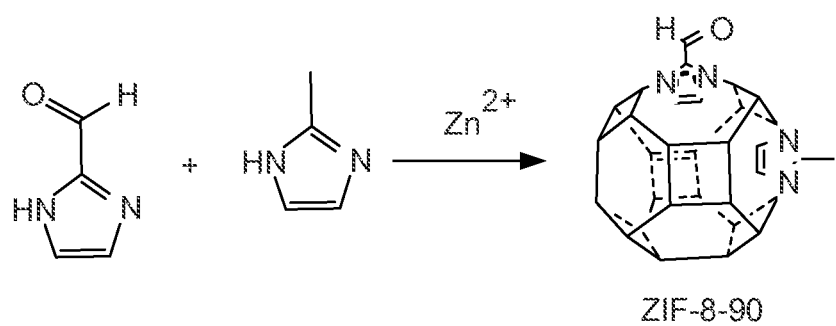
FIG. 4: Synthesis of hybrid ZIF-8-90.
Figure 5:
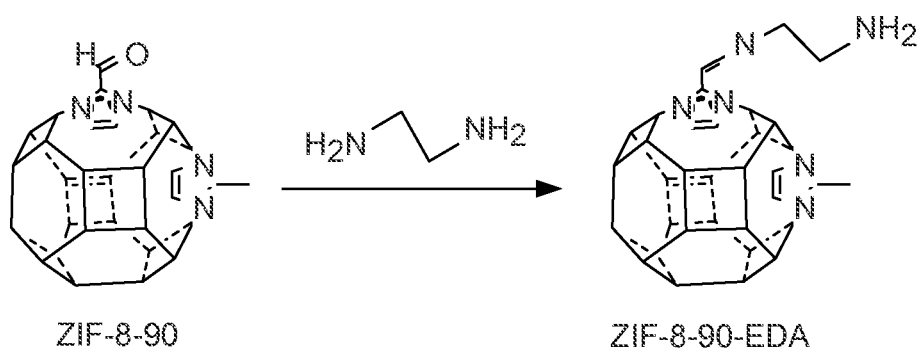
FIG. 5: Synthesis of ZIF-8-90-EDA.

The mixed matrix polymeric membranes can be prepared by first functionalizing MOFs (e.g., ZIFs) with at least one functional group and attaching the functionalized MOFs to polymers that are then used to produce the membranes. As explained above, in preferred aspects, the attachment can be through a covalent bond, such as a covalent bond being formed between a functional group or linker from the MOFs and a reactive group from the polymers making up the polymeric matrix. Still further, the MOFs can have a single functional group or multiple functional groups (e.g., 2, 3, 4, 5, 6, 7, or more) such that each MOF can have a single attachment or multiple attachments to the polymeric matrix. Even further, the functional groups on each MOF can be the same or can be different functional groups. Also, MOFs with functional groups can form covalent bonds and non-covalent bonds (e.g., hydrogen bonds or Van der Waals interactions) with the polymeric matrix. Referring to FIG. 2, imidazolate ligands are combined with a zinc metal to create the ZIF, which is then functionalized. Non-limiting examples of functional groups or linkers that can be used to modify the MOFs are provided in FIGS. 2 and 3, and in the summary of the invention section of this application, all of which are incorporated by reference. In particular, FIG. 2 provides for functionalizing a ZIF with a diamine (e.g., ethylenediamine or EDA), which can be performed by mixing EDA with a ZIF in alcohol followed by refluxing for a sufficient period of time (e.g., up to 24 hours). This allows for the EDA to react with and form a covalent bond with a reactive group present on the ZIF (e.g., carboxylic acid group). The resulting mixture can then be dried under vacuum to produce a dried powder (e.g., 85° C. for up to 48 hours). While a particular functionalized ZIF is illustrated in FIGS. 2, 4 and 5 (e.g., ZIF-8-90 and ZIF-8-90-EDA), other imidazolate ligands and metals may be used to create a variety of ZIFs (see above). Further, the functional group can be any functional group or groups which allow attachment of the MOF to the polymeric membrane. In some embodiments, the MOF already contains the necessary functional group. In some embodiments, the MOF can be modified to be functionalized. In some aspects, the MOF may be functionalized with more than one different functional group. For example, the functional group may be an amino group, an imine group, or combinations thereof.

The addition of the functional group to create modified or functionalized ZIFs provides an avenue to tune the pore size of the modified ZIF. In particular, the pore size of the modified hybrid ZIFs can be controlled by the ratio of the imidazole ligands to the introduced functional groups, and the pore sizes may be adjusted by changing the ratio of ligands on the MOFs and the functional groups. That ratio will affect the pore size of the ZIF, which may be between 0.1 and 5 nm. These pore sizes can be used to increase or tune the selectivity of the membrane for particular gases and other compounds in order to target the desired molecule or compound. In addition, the selection of the polymer for the membrane can also determine the selectivity of the membrane. In addition, the pore size changes not only with the ratio of ligands, but also with the kinds of ligands used. The pore size can be controlled by two parameters: one is the ratio of ligands (unfunctionalized ligands to functionalized ligands), the other is the linker between the ZIF and the polymers.

2. Attaching the MOFs to Polymers

Figure 7A:
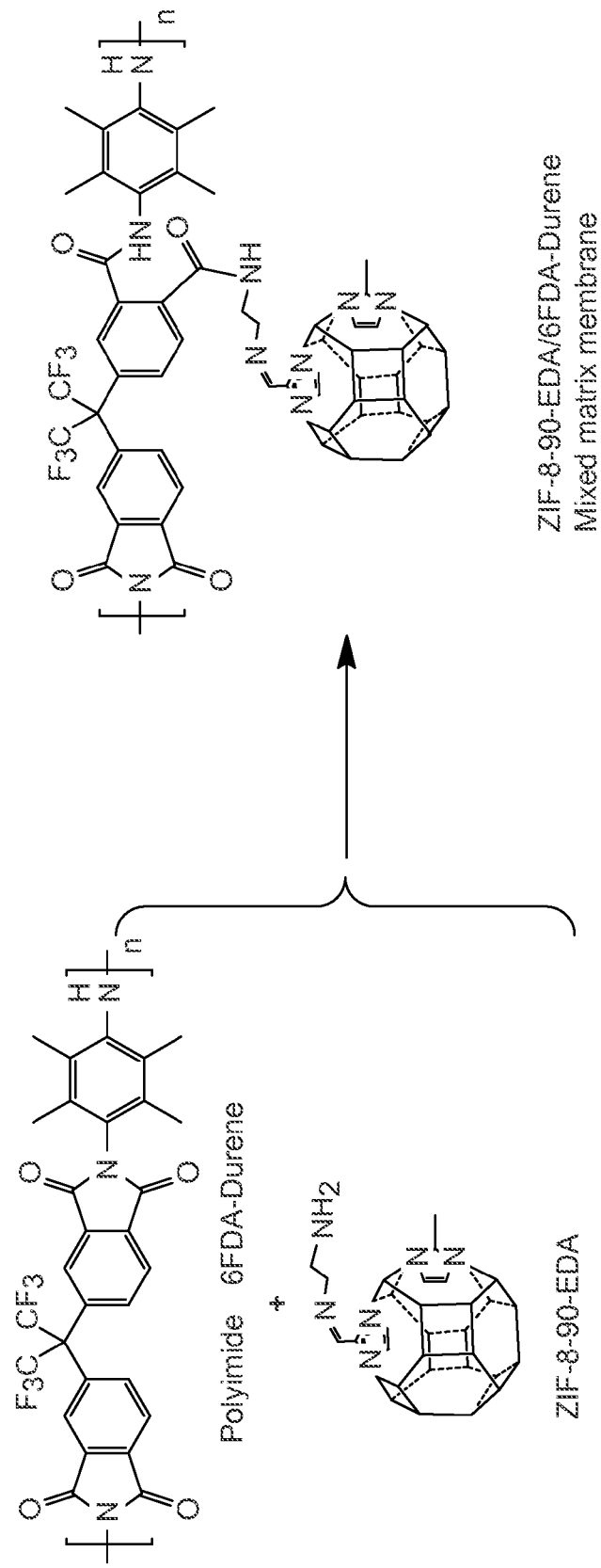
FIG. 7: (A) Illustration of the preparation of hybrid ZIF-8-90-EDA/polyimide mixed/PIM matrix membrane. (B) Illustration of the preparation of plasma treated-mixed matrix membranes.
Figure 7B:
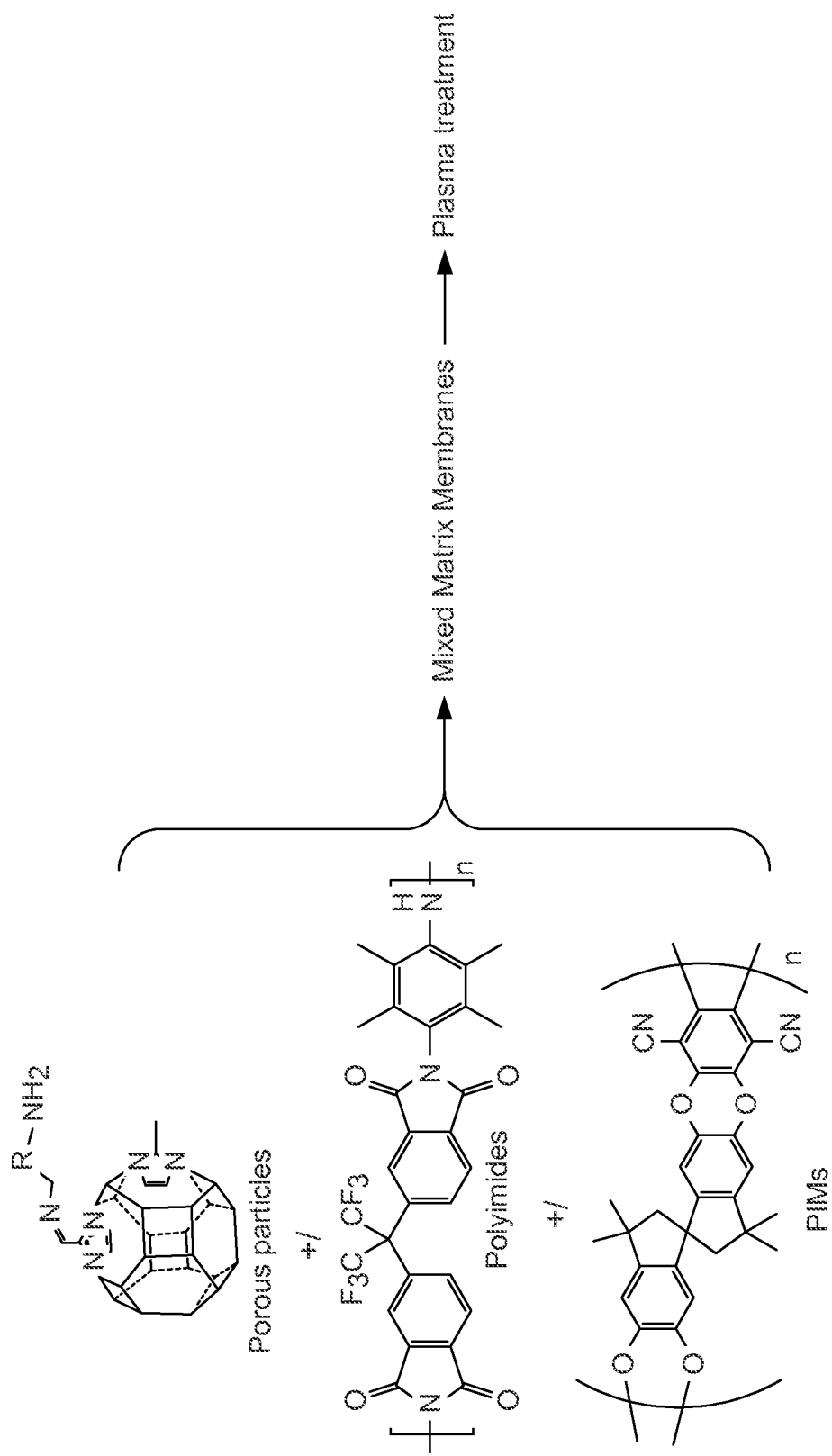
Figure 8:
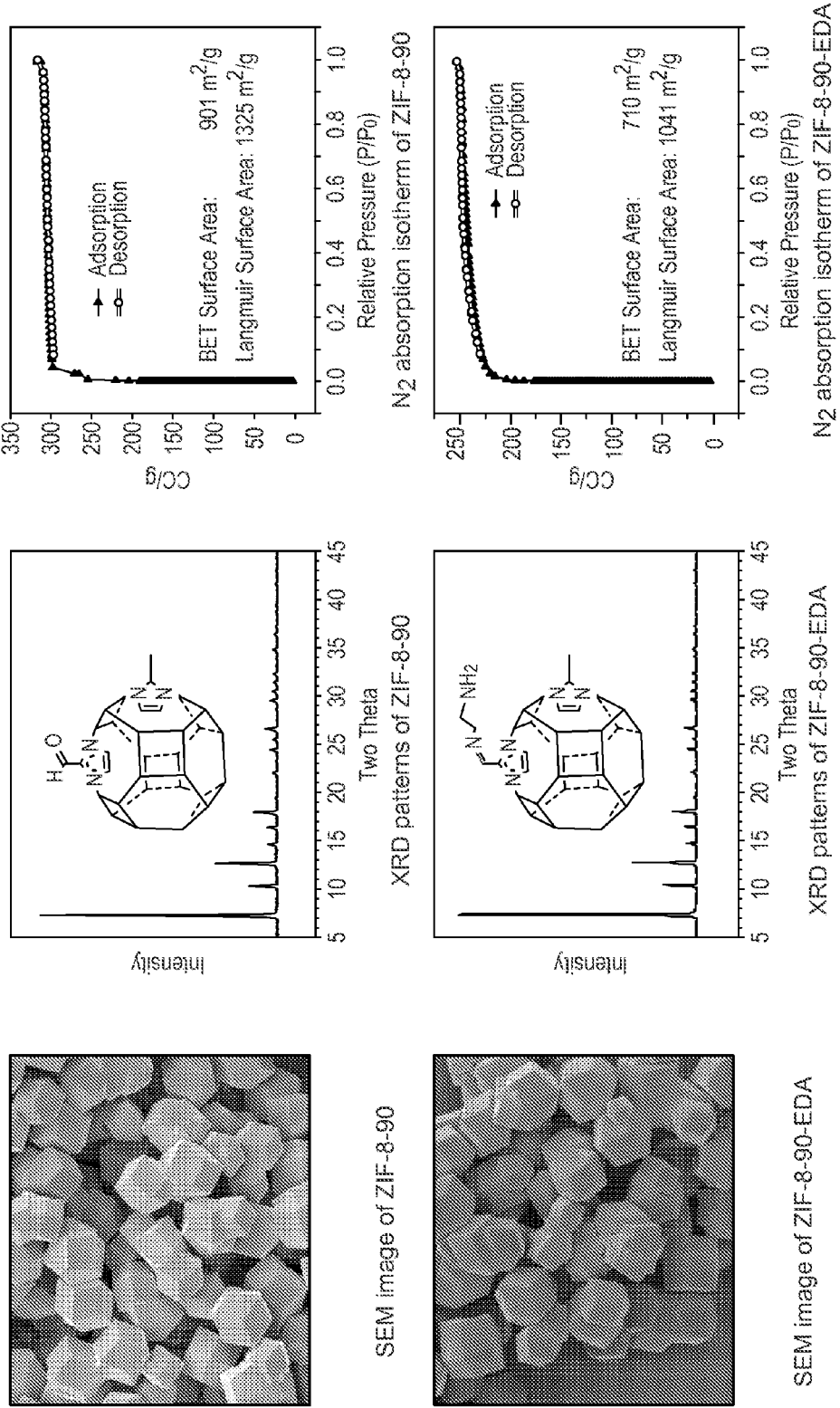
FIG. 8: SEM images, XRD patterns and $N_2$ isotherm of ZIF-8-90 and ZIF-8-90-EDA.

The functionalized ZIFs can then be attached to polymers or polymer blends. The attachment can be affected through hydrogen or covalent bonds or Van der Waals interaction between the functional group/linkers of the ZIFs with reactive groups of the polymers. FIGS. 2, 7, and 8 each illustrate attachment through covalent bonds. The attachment can be obtained by preparing a dispersion of the modified ZIFs (e.g., dispersing said ZIFs in chloroform with sonication), adding a polymer solution (e.g., a single polymer or a combination of polymers can be included the solution) to the dispersion, and then stirring the mixture for a sufficient period of time (e.g., up to 24 hours) so as to allow a chemical reaction to form between the functionalized groups/linkers of the ZIFs and reactive groups of the polymers. FIG. 7 provides a non-limiting example of a specific covalent bond between the ZIF and a polyimide polymer.

3. Preparing and Treating the Mixed Matrix Membranes

There are many known methods for making polymeric membranes. Such methods that can be used include air casting (i.e., the dissolved polymer solution passes under a series of air flow ducts that control the evaporation of the solvents in a particular set period of time such as 24 to 48 hours), solvent or emersion casting, (i.e., the dissolved polymer is spread onto a moving belt and run through a bath or liquid in which the liquid within the bath exchanges with the solvent, thereby causing the formation of pores and the thus produced membrane is further dried), and thermal casting (i.e., heat is used to drive the solubility of the polymer in a given solvent system and the heated solution is then cast onto a moving belt and subjected to cooling).

A particular non-limiting process to make the mixed matrix polymeric membranes of the present invention is provided below:

(1) Obtaining a solution of a polymer in which a ZIF is attached thereto, wherein the polymer is dissolved in an appropriate solvent (such as chloroform) and pouring the solution onto a glass plate. For blended polymeric membranes, the solution can have two, three, or more different polymers dissolved in said solvent.

(2) The poured material/glass plate is placed into a vacuum oven at mild temperature (around 70° C.) for up to 2 days to dry.

(3) Upon drying, the membrane thickness is measured (typically 60-100 um thick when dry).

(4) The dried membrane can then be treated as follows:
   (i) Plasma Treatment: In one non-limiting aspect, the plasma treatment can include subjecting at least a portion of the surface of the polymeric membrane to a plasma comprising a reactive species. The plasma can be generated by subjecting a reactive gas to a RF discharge with a RF power of 10 W to 700 W. The length of time the surface is subjected to the reactive species can be 30 seconds to 30 minutes at a temperature of 15° C. to 80° C. and at a pressure of 0.1 Torr to 0.5 Torr. A wide range of reactive gases can be used. In a particular aspect, the reactive gas can be a mixture of $O_2$ and $CF_4$ at a ratio of up to 1:2, where $O_2$ is provided at a flow rate of 0 to 40 cm$^3$/min. and $CF_4$ is provided at a flow rate of 30 to 100 cm$^3$/min.
   (ii) Electromagnetic Treatment: In one non-limiting aspect, the electromagnetic treatment can take place by subjecting the membrane to a selected radiation (e.g, UV radiation, microwaves, laser sources, etc.) for a specified amount of time at a constant distance from the radiation source. For example, the membrane can be treated with said radiation for 30 to 500 minutes or from 60 to 300 minutes or from 90 to 240 minutes or from 120 to 240 minutes.
   (iii) Thermal Treatment: For thermal-treatment, such treatment can take place in a thermal treatment furnace at a selected temperature for a selected period of time. For example, the membrane can be thermally-treated at a temperature of 100 to 400° C. or from 200 to 350° C. or from 250 to 350° C. for 12 to 96 hours or 24 to 96 hours or 36 to 96 hours.
   (iv) Any combination of treatments (i), (ii), or (iii) can be used on a given membrane. Also, all of the treatments can be used on a given membrane. The sequence of treatments can overlap with one another or can be performed one after the other.

(5) The treated mixed matrix membrane can then be tested for single gas permeation of various gases.

Alternatively, the polymers having the attached ZIFs can be subjected to said energy treatment and then be used to form the treated membranes (e.g., the polymers can be treated and then be used to form the treated membrane or the polymers can be treated and the formed membrane can also be treated to form the treated membrane). In this sense, step (4) can be removed and a step (1a) added in which the MOF/polymer from step (1) is subjected to said energy treatment (i.e., (i)-(iv)) prior to step (2) or (3), or step (1a) can be used in combination with step (4).

For permeation, testing is based on single gas measurement, in which the system is evacuated. The membrane is then purged with the desired gas three times. The membrane is tested following the purge for up to 8 hours. To test the second gas, the system is evacuated again and purged three times with this second gas. This process is repeated for any additional gasses. The permeation testing is set at a fixed temperature (20-50° C., preferably 25° C.) and pressure (preferably 2 atm). Additional treatments can be performed such as with chemicals, e-beam, gamma radiation, etc.

The treated mixed matrix membranes can eliminate non-selective interfacial voids that are larger than the penetrating gas molecules between the polymers of the membrane and the MOF entirely (void-free) or can reduce the size of the majority of or all of the voids present between the polymer/MOF interface to less than 5 Angstroms (substantially void-free). The reduction or elimination of these voids effectively improves the selectivity of the membrane.

Additionally, the materials and methods of making the disclosed membranes allows for precise placement of a specified number of MOFs in the membrane. Additionally, specific molecular interactions or direct covalent linking may be used to facilitate ordering or orientation of the MOFs on the polymer or the membrane. Such methods also can eliminate or reduce defects at the molecular sieve/polymer interface.

D. Membrane Applications

The membranes of the present invention have a wide-range of commercial applications. For instance, and with respect to the petro-chemical and chemical industries, there are numerous petro-chemical/chemical processes that supply pure or enriched gases such as He, $N_2$, and $O_2$, which use membranes to purify or enrich such gases. Further, removal, recapture, and reuse of gases such as $CO_2$ and $H_2S$ from chemical process waste and from natural gas streams is of critical importance for complying with government regulations concerning the production of such gases as well as for environmental factors. Also, efficient separation of olefin and paraffin gases is key in the petrochemical industry. Such olefin/paraffin mixtures can originate from steam cracking units (e.g., ethylene production), catalytic cracking units (e.g., motor gasoline production), or dehydration of paraffins. Membranes of the invention can be used in each of these as well as other applications. For instance, and as illustrated in the Examples, the treated membranes are particularly useful for $H_2/N_2$, $H_2/CH_4$, or $CO_2/CH_4$ gas separation applications.

The membranes of the present invention can be used in the purification, separation or adsorption of a particular species in the liquid or gas phase. In addition to separation of pairs of gases, the membranes can also be used to separate proteins or other thermally unstable compounds. The membranes may also be used in fermenters and bioreactors to transport gases into the reaction vessel and to transfer cell culture medium out of the vessel. Additionally, the membranes can be used to remove microorganisms from air or water streams, water purification, in ethanol production in a continuous fermentation/membrane pervaporation system, and/or in detection or removal of trace compounds or metal salts in air or water streams.

In another instance, the membranes can be used in the separation of liquid mixtures by pervaporation, such as in the removal of organic compounds (e.g., alcohols, phenols, chlorinated hydrocarbons, pyridines, ketones) from water such as in aqueous effluents or process fluids. By way of example, a membrane that is ethanol-selective could be used to increase the ethanol concentration in relatively dilute ethanol solutions (e.g., less than 10% ethanol or less than 5% ethanol or from 5 to 10% ethanol) obtained by fermentation processes. A further liquid phase separation example that is contemplated with the compositions and membranes of the present invention includes the deep desulfurization of gasoline and diesel fuels by a pervaporation membrane process (see, e.g., U.S. Pat. No. 7,048,846, which is incorporated by reference). Compositions and membranes of the present invention that are selective to sulfur-containing molecules could be used to selectively remove sulfur-containing molecules from fluid catalytic cracking (FCC) and other naphtha hydrocarbon streams. Further, mixtures of organic compounds that can be separated with the compositions and membranes of the present invention include ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and/or ethylacetate-ethanol-acetic acid.

In particular instances, the membranes of the present invention can be used in gas separation processes in air purification, petrochemical, refinery, natural gas industries. Examples of such separations include separation of volatile organic compounds (such as toluene, xylene, and acetone) from chemical process waste streams and from Flue gas streams. Further examples of such separations include the separation of $CO_2$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the blended polymeric membranes described herein. More than two gases can be removed from a third gas. For example, some of the gas components which can be selectively removed from a raw natural gas using the membranes described herein include carbon dioxide, oxygen, nitrogen, water vapor, hydrogen sulfide, helium, and other trace gases. Some of the gas components that can be selectively retained include hydrocarbon gases. In further instances, the membranes can be used on a mixture of gases that include at least 2, 3, 4, or more gases such that a selected gas or gases pass through the membrane (e.g., permeated gas or a mixture of permeated gases) while the remaining gas or gases do not pass through the membrane (e.g., retained gas or a mixture of retained gases).

Additionally, the membranes of the present invention can be used to separate organic molecules from water (e.g., ethanol and/or phenol from water by pervaporation) and removal of metal (e.g., mercury(II) ion and radioactive cesium(I) ion) and other organic compounds (e.g., benzene and atrazene) from water.

A further use of the membranes of the present invention includes their use in chemical reactors to enhance the yield of equilibrium-limited reactions by selective removal of a specific product in an analogous fashion to the use of hydrophilic membranes to enhance esterification yield by the removal of water.

The membranes of the present invention can also be fabricated into any convenient form such as sheets, tubes, spiral, or hollow fibers. They can also be fabricated into thin film composite membranes incorporating a selective thin layer that has been UV- and thermally-treated and a porous supporting layer comprising a different polymer material.

Table 1 includes some particular non-limiting gas separation applications of the present invention.

TABLE 1

| Gas Separation | Application |
|---|---|
| $O_2/N_2$ | Nitrogen generation, oxygen enrichment |
| $H_2$/hydrocarbons | Refinery hydrocarbon recovery |
| $H_2$/CO | Syngas ratio adjustment |
| $H_2/N_2$ | Ammonia purge gas |
| $CO_2$/hydrocarbon | Acid gas treating, enhanced oil recovery, landfill gas upgrading, pollution control |
| $H_2S$/hydrocarbon | Sour gas treating |
| $H_2O$/hydrocarbon | Natural gas dehydration |
| $H_2O$/air | Air dehydration |
| Hydrocarbons/air | Pollution control, hydrocarbon recovery |
| Hydrocarbons from process streams | Organic solvent recovery, monomer recovery |
| Olefin/paraffin | Refinery |

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of Hybrid ZIF-8-90

A solution of 100 mmol of Sodium formate, (100-x) mmol of 2-methylimidazole and x mmol of carboxaldehyde-2-imidazole in 250 mL of MeOH was prepared. To fully dissolve the OHC-IM ligand, the solution was heated to 50° C. until it became clear. A separate solution was prepared with 25 mmol of $Zn(NO_3)_2.6H_2O$ and 250 mL of deionized $H_2O$. After the MeOH solution cooled to room temperature, the Zn salt solution was poured into the former solution and allowed to stir at room temperature for 2 h. The resulting milky precipitate was collected by centrifugation. And then the precipitate was dispersed in 100 mL of MeOH and washed three times. The powder was dried in an oven at 85° C. under vacuum for 48 h (FIG. 4).

Example 2

Synthesis of ZIF-8-90-EDA 2 ml of ethylenediamine and 2 g of hybrid ZIF-8-90 were mixed in 100 ml of methanol and refluxed over 24 h under $N_2$ atmosphere. The reaction mixture was cooled down to room temperature. The powder was collected by centrifugation and washed with methanol three times. The powder was dried in an oven at 85° C. under vacuum for 48 h (FIG. 5).

Example 3

Synthesis of Polyimide 6FDA-Durene

Figure 6:
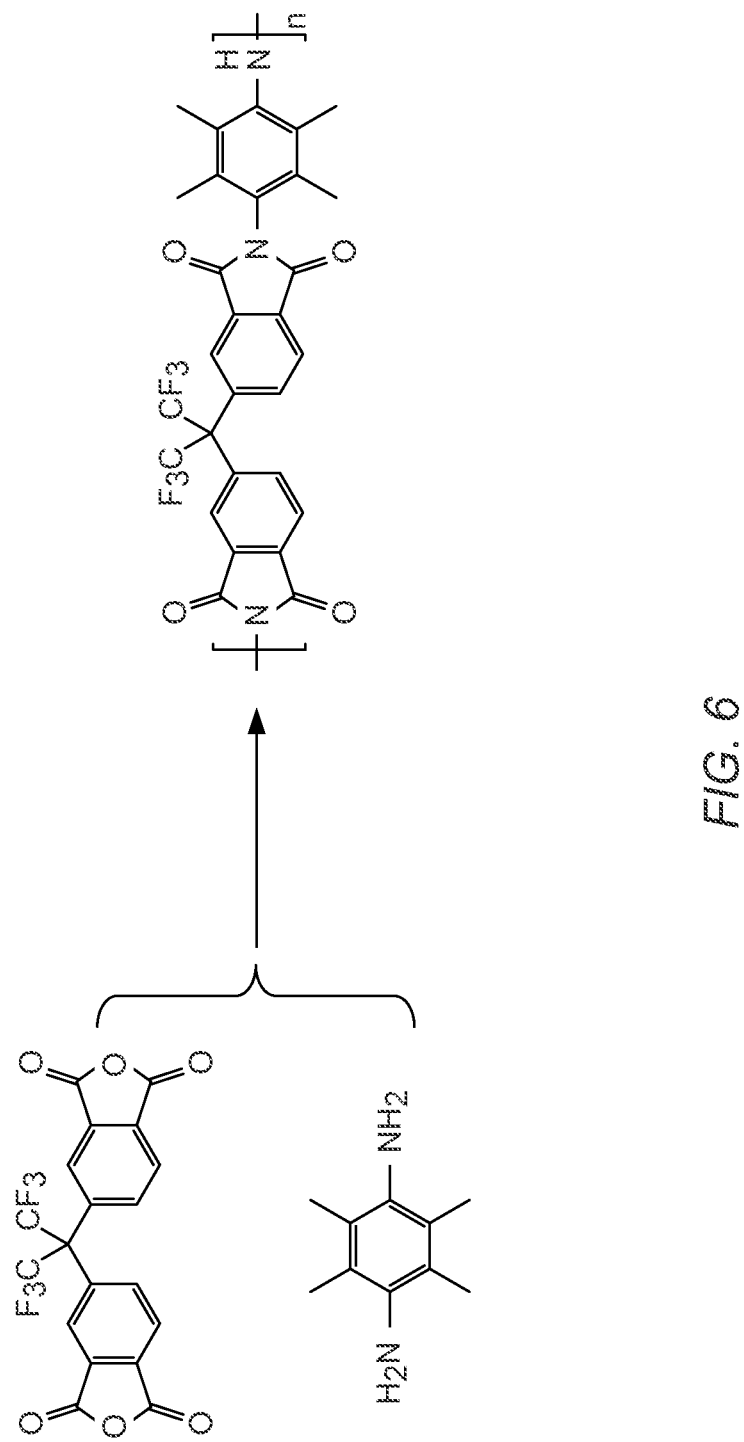
FIG. 6: Synthesis of polyimide 6FDA-Durene.

To a 250 mL of three-neck round flask, 4,4'-(hexafluoroisopropylidene)diphthalic anhydride (10 mmol) and 2,3,5,6-Tetramethyl-p-phenylenediamine (10 mmol) were dissolved in 30 ml of anhydrous NMP and stirred for 24 h under $N_2$ atmosphere. Then added 226.6 mmol acetic anhydride and 11.55 mmol of pyridine was added to the reaction solution and stirred for 48 h. The polymer was precipitated from methanol three times. A white polymer was obtained and dried at 120° C. under vacuum for 48 h (FIG. 6).

Example 4

Preparation of Hybrid ZIF-8-90-EDA/Polyimide/PIM Mixed Matrix Membrane 0.5 g of PIM-1 or 6FDA-Durene or blends thereof was dissolved in 15 ml of $CHCl_3$. After being filtered by 0.25 μm film, the solution was mixed with 0.25 g of modified ZIF-8-90-EDA under sonication. The resulting mixture was cast in a steel ring with a glass plate and the solvent was evaporated at room temperature. The membrane was further dried in a vacuum oven at 120° C. overnight to remove any remaining solvent (FIG. 7).

Example 5

Morphology of Produced Mixed Matrix Membranes Prior to Plasma Treatment

Powder x-ray diffraction (XRD) patterns were recorded at room temperature on a Bruker D8 ADVANCE diffractometer in transmission geometry using CuKα radiation ($\lambda$=1.54059 Å) at 40 kV and 40 mA. Field-emission scanning electron microscope (SEM) pictures were taken by a FEI Quanta 600 FEG. Nitrogen physisorption isotherms were measured at 77 K on an automatic volumetric adsorption apparatus (Micromertics ASAP 2420). The samples were filled into glass ampoules and degassed in high vacuum at 393 K for 24 h before the start of the sorption measurements. Infrared spectra were acquired from KBr pellets of samples using a Nicolet 6700 FTIR spectrophotometer. Single gas permeation measurements were carried out using a custom-built gas permeameter. The permeameter consists of a stainless steel permeation cell which separates an upstream pressure transducer from a downstream pressure transducer. The permeation cell was tightly sealed and loaded into a constant volume permeation system. Vacuum was applied to both faces of the sample until the system leak rate minimizes. Before each gas was tested, 1-2 h of leak data is collected. Pure gas permeation measurements were performed at 35° C. and upstream pressure of ~2 Bar.

Figure 9:
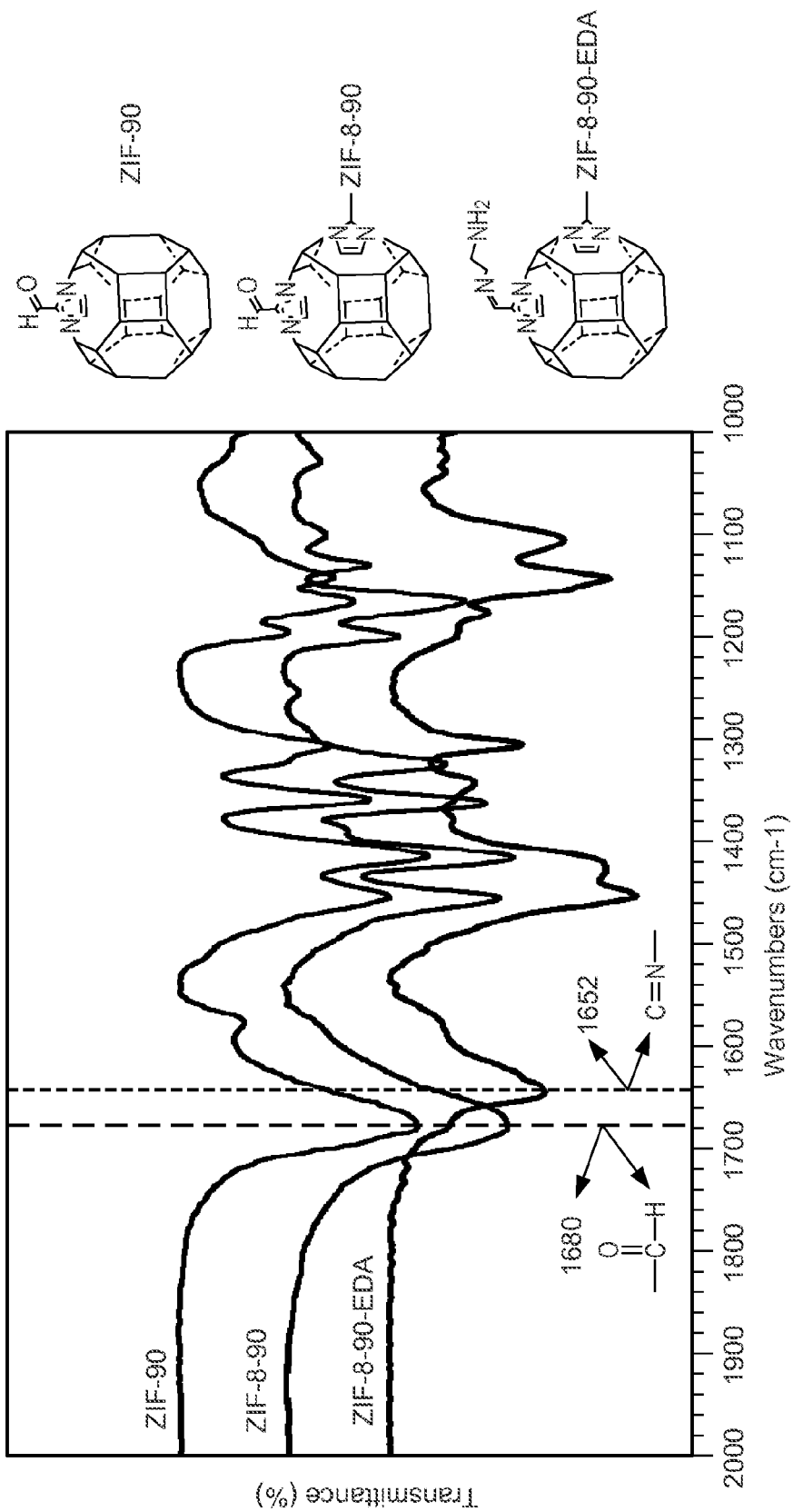
FIG. 9: FT-IR spectra of ZIF-90, ZIF-8-90 and ZIF-8-90-EDA.
Figure 10:
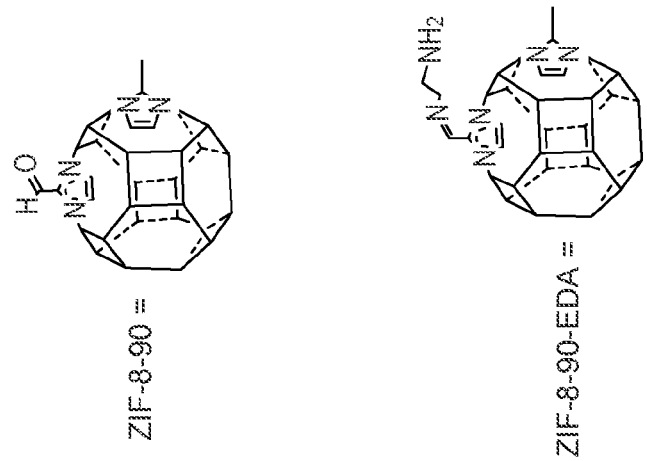
FIG. 10: Pore size distribution of ZIF-8-90 and ZIF-8-90-EDA.
Figure 10:
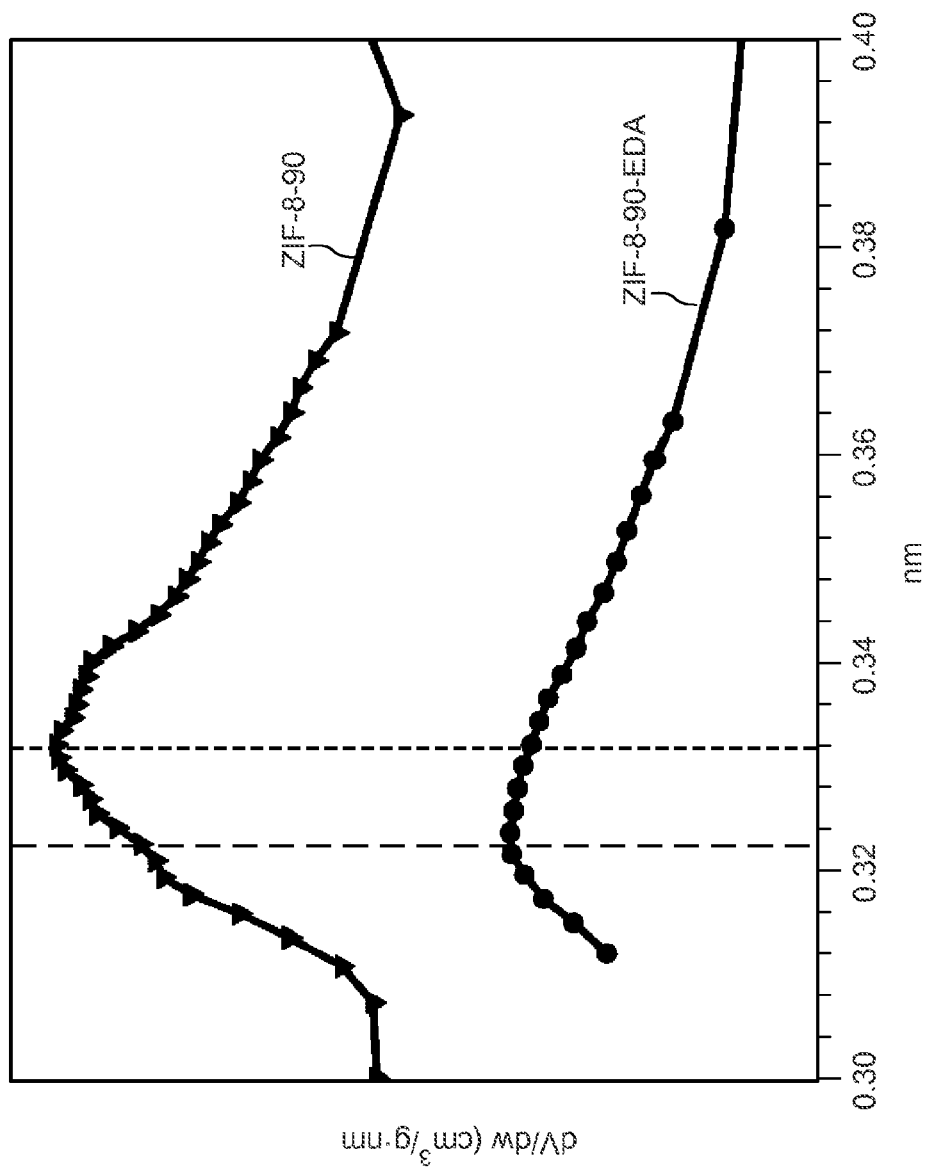
Figure 11:
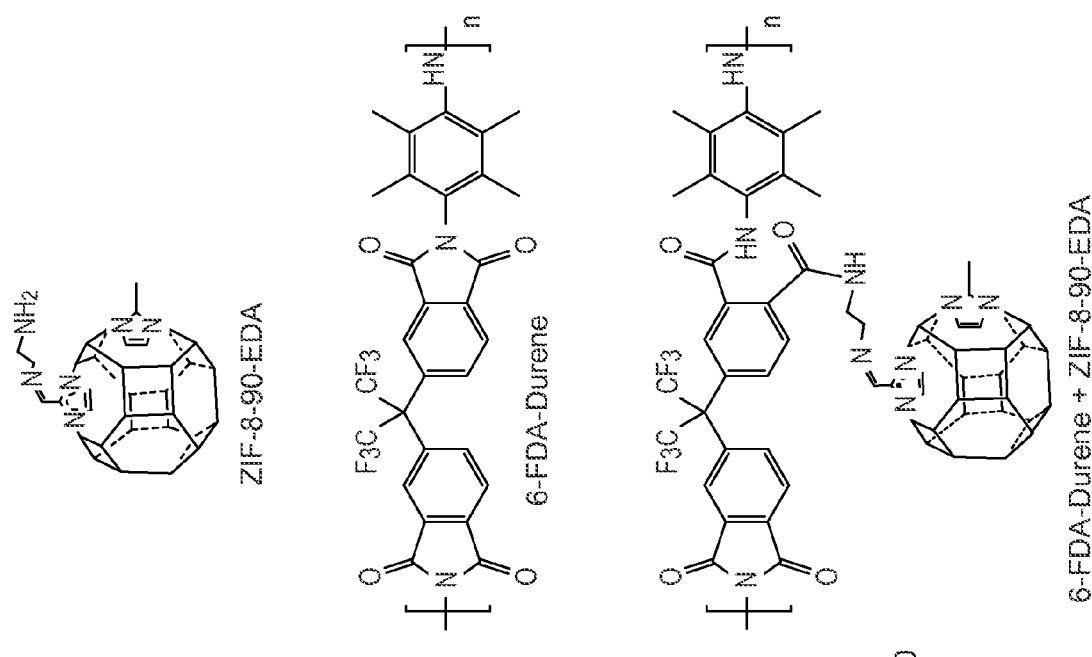
FIG. 11: FT-IR spectra of ZIF-8-90-EDA, polyimide 6FDA-Durene and mixed matrix membrane.
Figure 11:
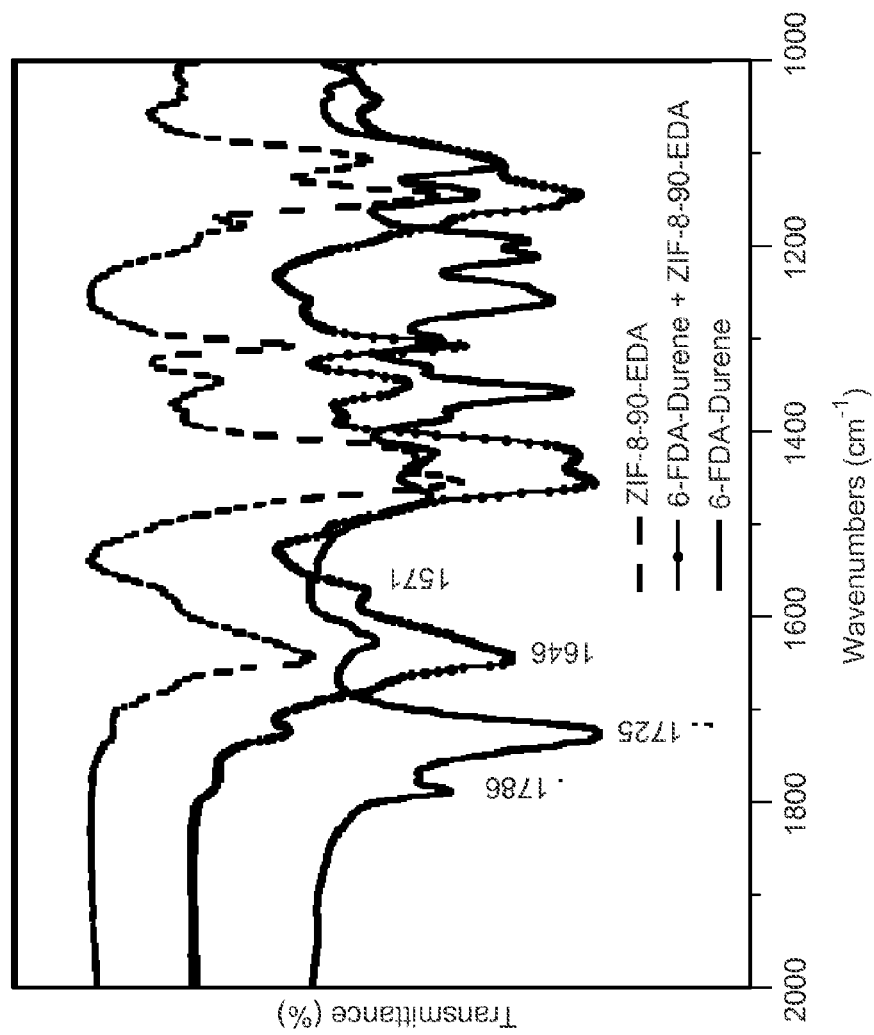
Figure 12:
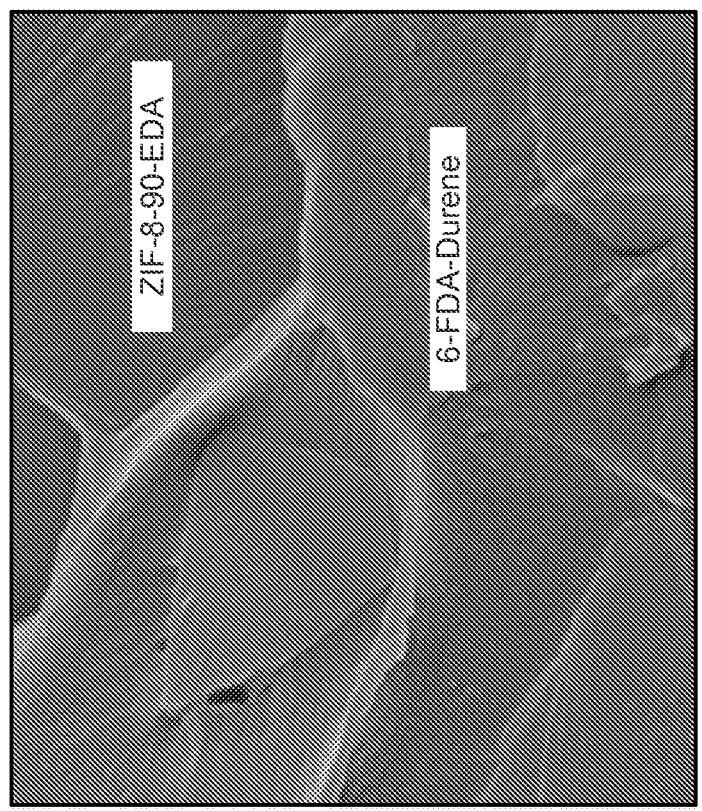
FIG. 12: SEM cross section image of mixed matrix membrane.
Figure 13:
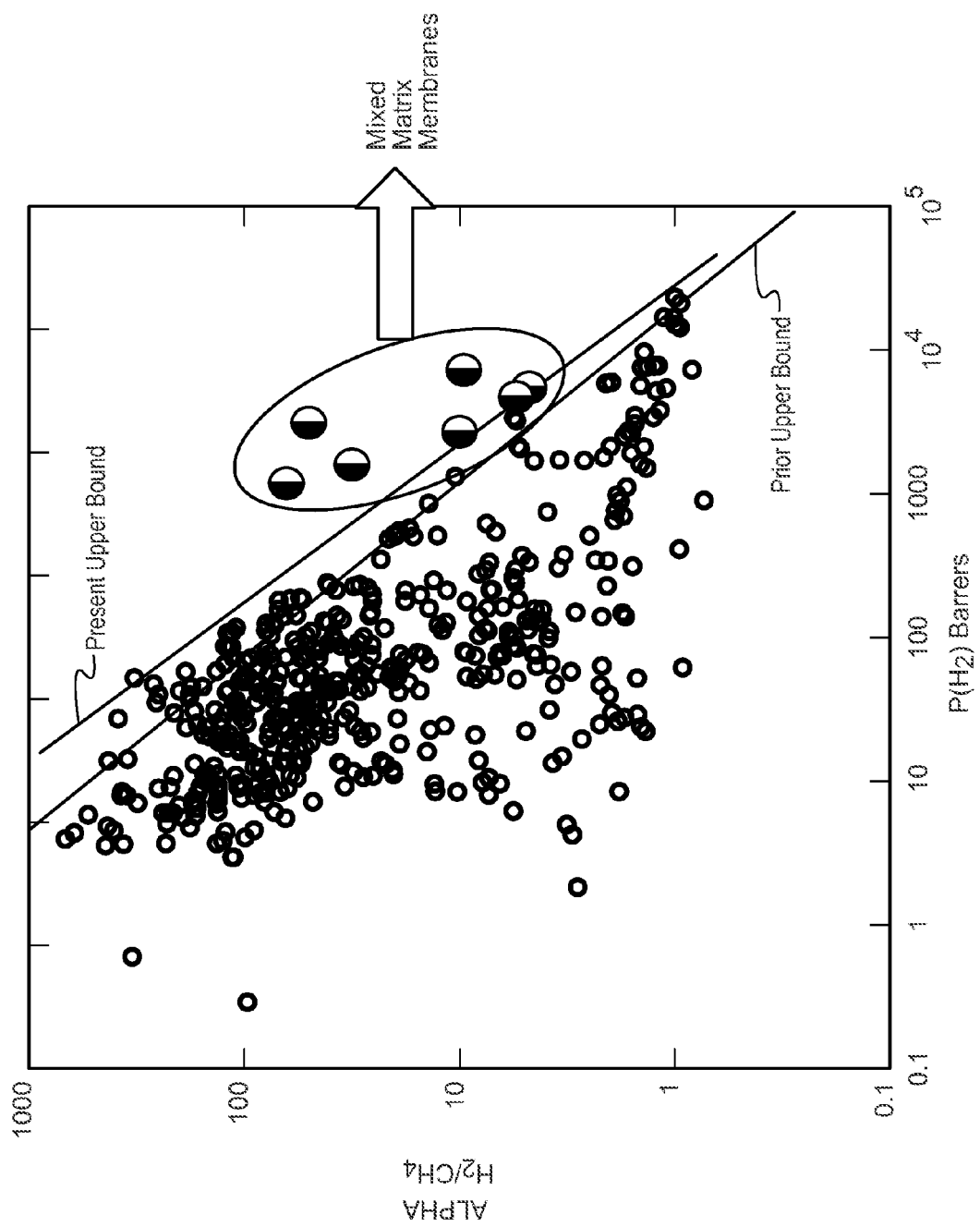
FIG. 13: Gas separation performance for $H_2/CH_4$ of various plasma treated mixed matrix membranes of the present invention.
Figure 14:
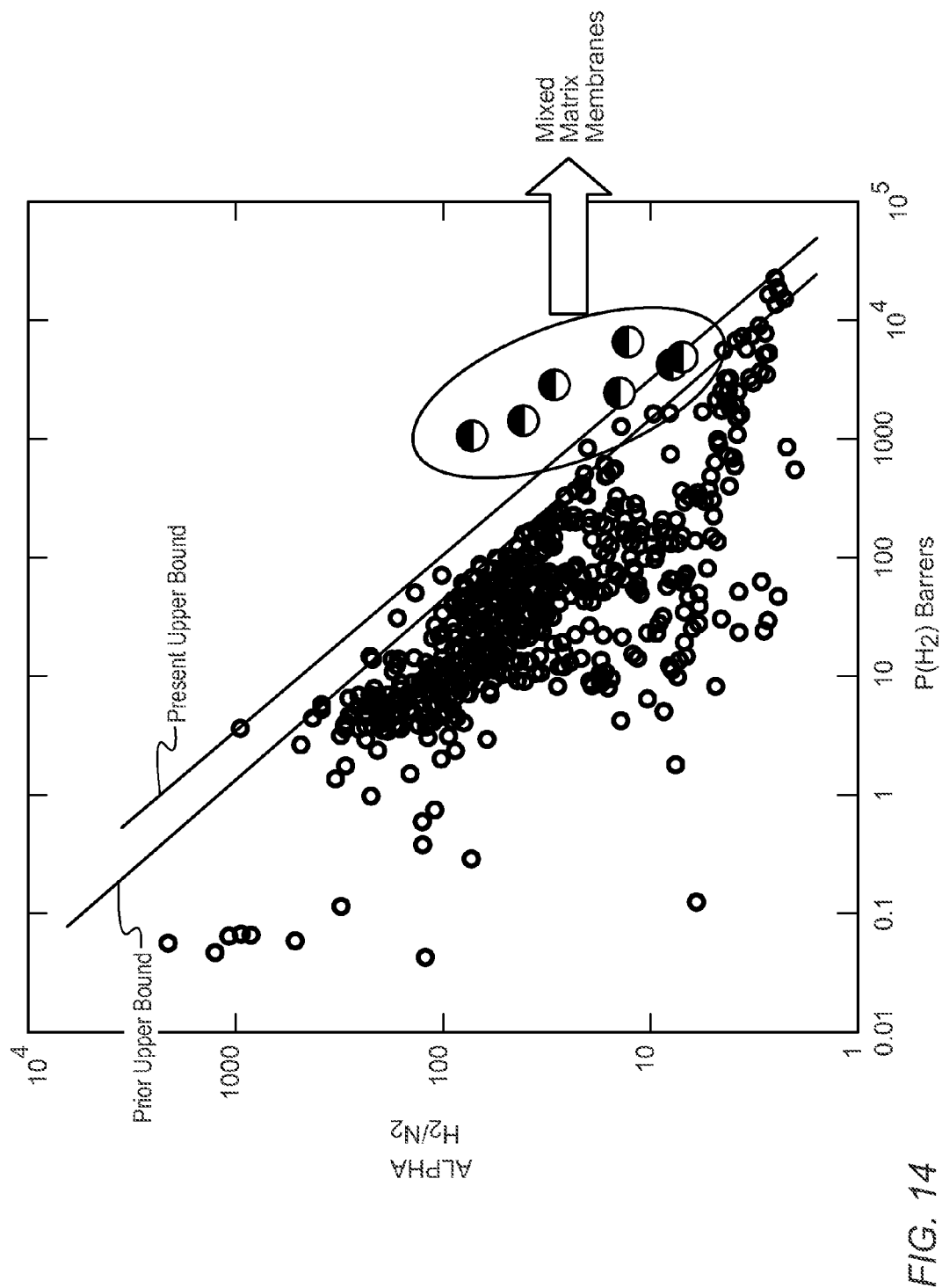
FIG. 14: Gas separation performance for $H_2/N_2$ of various plasma treated mixed matrix membranes of the present invention.
Figure 15:
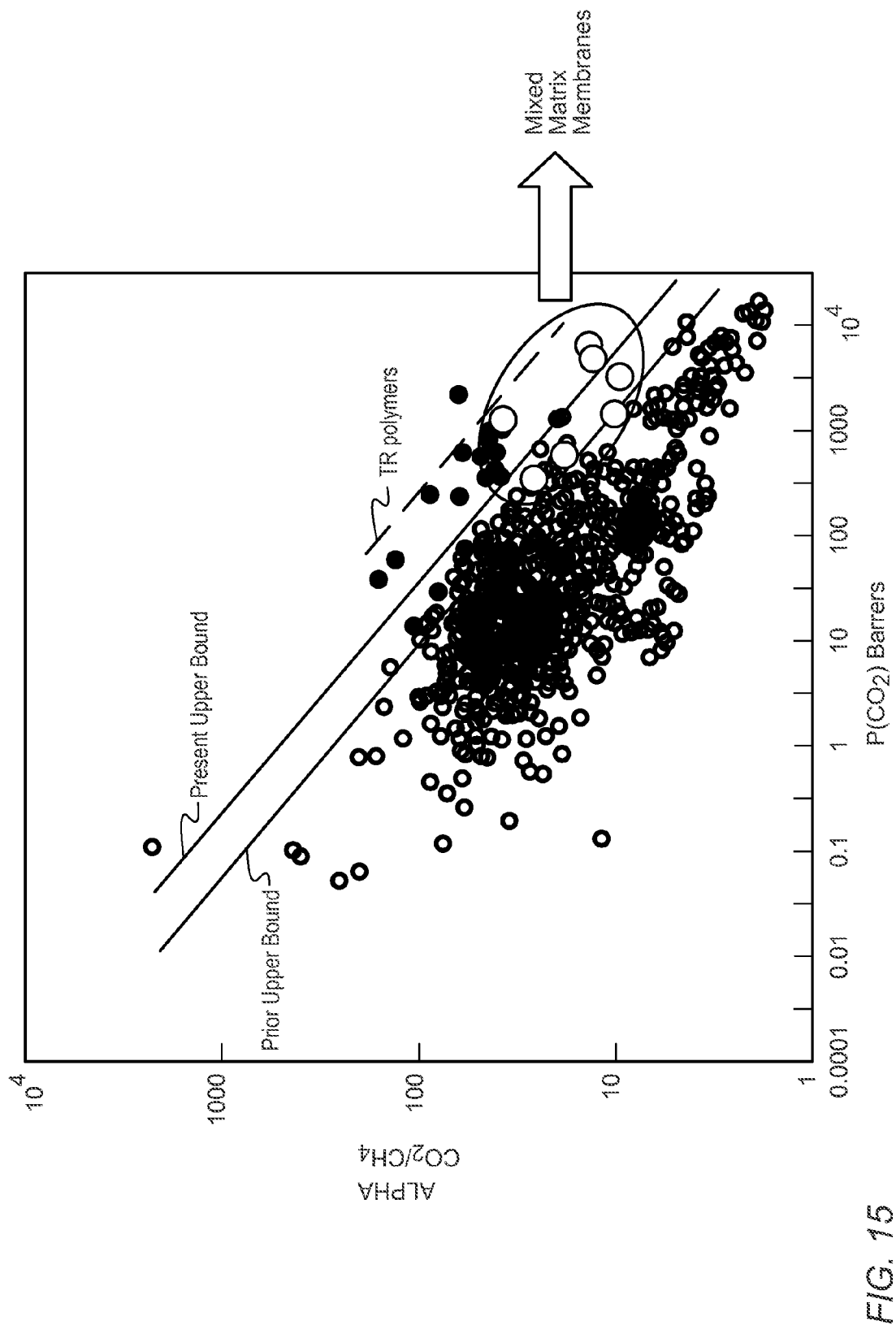
FIG. 15: Gas separation performance for $CO_2/CH_4$ of various plasma treated mixed matrix membranes of the present invention.
Figure 16:
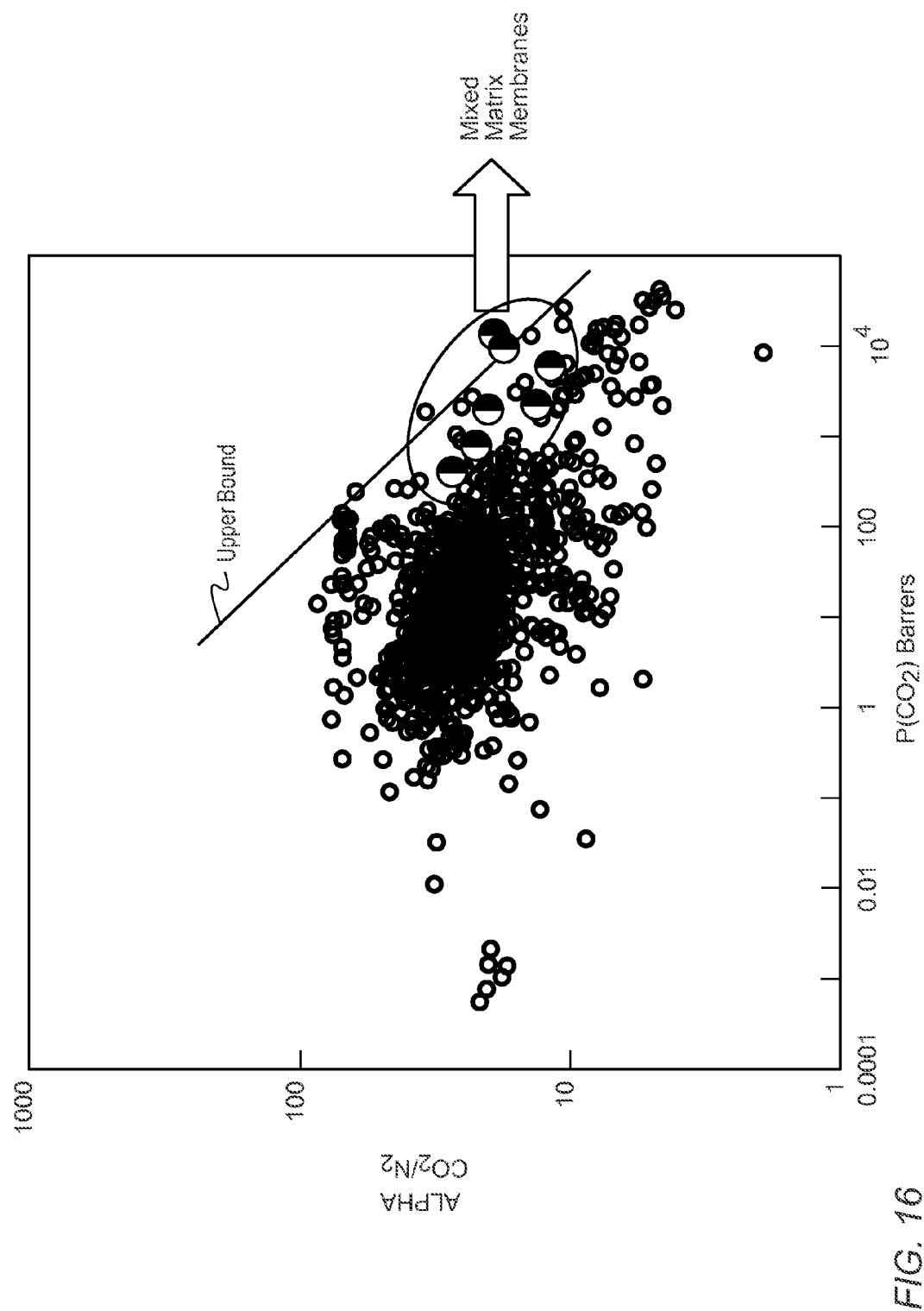
FIG. 16: Gas separation performance for $CO_2/N_2$ of various plasma treated mixed matrix membranes of the present invention.

The results of SEM, XRD and BET indicate ZIF-8-90-EDA is crystalline and porous (FIG. 8). The characteristic peak 1680 $cm^{-1}$ attributed to asymmetric stretch of C=O in the aldehyde group in ZIF-90 and ZIF-8-90. When ZIF-8-90 reacted with ethylenediamine, the characteristic peak 1680 $cm^{-1}$ disappeared, and a new peak at 1652 $cm^{-1}$ appeared, which attributed to the characteristic peak of stretch of C=N of resulted ZIF-8-90-EDA, (FIG. 9). When ZIF-8-90 reacted with ethylenediamine, the pore size of the resulted ZIF-8-90-EDA became smaller (FIG. 10). For polyimide 6FDA-Durene, after mixed with ZIF-8-90, the intensities of the characteristic peaks of imide groups at 1786 $cm^{-1}$ (asymmetric stretch of C=O in the imide group) and 1725 $cm^{-1}$ (symmetric stretch of C=O in the imide group) decreased and amide group at 1571 $cm^{-1}$ (stretch of C—N in the amide group) appeared (FIG. 11). From the SEM image, it can be seen that there is no void between the ZIF-8-90-EDA and polyimide (FIG. 12).

Example 6

Plasma Treatment of Hybrid ZIF-8-90 EDA/Polyimide Mixed Matrix Membrane

The membrane from Example 4 was subjected to plasma treatment using a Nanoplas (DSB 6000 Boost) machine. The membrane was placed into the center of the chamber and subjected to the operating conditions noted in Table 2.

TABLE 2

| Purged Gas | $O_2$ at 15 sccm and $CF_4$ at 40 sccm |
| Temperature | 50° C. |
| Power | 500 W |
| Pressure | 400 mTorr |
| Exposure Time | 3-4 min |

Additional membranes were also prepared and treated with ultra-violet light and according to the processes in Table 2, the specifics of which are provided in Tables 3 and 4.

Example 7

Permeability and Selectivity Data

The gas transport properties were measured using the variable pressure (constant volume) method. Ultrahigh-purity gases (99.99%) were used for all experiments. The membrane is mounted in a permeation cell prior to degassing the whole apparatus. Permeant gas is then introduced on the upstream side, and the permeant pressure on the downstream side is monitored using a pressure transducer. From the known steady-state permeation rate, pressure difference across the membrane, permeable area and film thickness, the permeability coefficient is determined (pure gas tests). The permeability coefficient, P [$cm^3$ (STP)·cm/$cm^2$·s·cmHg], is determined by the following equation:

$$P = \frac{1}{760} \times \frac{V}{A} \times \frac{273}{273+T} \times \frac{L}{760p} \times \frac{dp}{dt}$$

where A is the membrane area ($cm^2$), L is the membrane thickness (cm), p is the differential pressure between the upstream and the downstream (MPa), V is the downstream volume ($cm^3$), R is the universal gas constant (6236.56 $cm^3$·cmHg/mol·K), T is the cell temperature (° C.), and dp/dt is the permeation rate.

The gas permeabilities of polymer membranes are characterized by a mean permeability coefficient with units of Barrer. 1 Barrer=$10^{-10}$ $cm^3$ (STP)·cm/$cm^2$·s·cmHg. The gas permeability coefficient can be explained on the basis of the solution-diffusion mechanism, which is represented by the following equation:

$$P = D \times S$$

where D ($cm^2$/s) is the diffusion coefficient; and S ($cm^3$ (STP/$cm^3$·cmHg) is the solubility coefficient.

The diffusion coefficient was calculated by the time-lag method, represented by the following equation:

$$D = \frac{L^2}{6\theta}$$

where $\theta$ (s) is the time-lag. Once P and D were calculated, the apparent solubility coefficient S ($cm^3$(STP)/$cm^3$·cmHg) may be calculated by the following expression:

$$S = \frac{P}{D}$$

In gas separation, the membrane selectivity is used to compare the separating capacity of a membrane for 2 (or more) species. The membrane selectivity for one component (A) over another component (B) is given by the ratio of their permeabilities:

$$\alpha_{A/B} = \frac{P_A}{P_B}$$

Selectivity obtained from ratio of pure gas permeabilities is called the ideal membrane selectivity or the ideal permselectivity. This is an intrinsic property of the membrane material. The ideal selectivity of a dense membrane for gas A to gas B is defined as follows:

$$\alpha = \frac{P_A}{P_B} = \frac{D_A}{D_B} * \frac{S_A}{S_B}$$

Permeability and ideal selectivity data for the produced membranes is provided in Tables 3 and 4, respectively. FIGS. 13-16 provide further selectivity data for the prepared membranes in reference to known Robeson upper-bound trade-off curves for various gas separation applications.

Example 8

Ultra Violet Treatment of and Permeability/Selectivity Data

The membrane from Example 4 was subjected to Ultra-violet light using a UV lamp at 312 nm wavelength. The membrane was placed into the center of the chamber and subjected to the operating conditions noted in Table 5.

TABLE 5

| Purged Gas | Air |
| Temperature | 23° C. |
| Power | 3 mW/cm2 |
| Pressure | atmospheric |
| Exposure Time | 4-9 hour |

TABLE 3

(Permeability Data)

| Sample | Plasma time (min) | Test Condition | Thickness (μm) | Permeability (Barrer) | | | | | | | |
|---|---|---|---|---|---|---|---|---|---|---|---|
| | | | | $N_2$ | $CH_4$ | $H_2$ | $C_2H_4$ | $C_2H_6$ | $C_3H_6$ | $C_3H_8$ | $CO_2$ |
| PIM:ZIF-8-90-EDA at 2:1 | 0.00 | 23° C., 2 Bar | 96 | 762.22 | 1088.19 | 5189.59 | 2366.93 | 796.47 | 11381.10 | 4635.06 | 14369.50 |
| PIM:ZIF-8-90-EDA at 2:1 | 3.00 | 23° C., 2 Bar | 99 | 37.52 | 46.61 | 1496.44 | 124.56 | 42.59 | 346.18 | 104.79 | 824.42 |
| PIM:ZIF-8-90-EDA at 2:1 | 4.00 | 23° C., 2 Bar | 99 | 15.60 | 16.87 | 1109.61 | 29.01 | 12.51 | 250.12 | 62.25 | 420.82 |
| PIM:ZIF-8 at 2:1 | 0.00 | 35° C., 2 Bar | 109 | 551.34 | 706.06 | 6832.68 | 1155.77 | 455.94 | 1928.19 | 465.85 | 6410.94 |
| PIM:ZIF-8 at 2:1 | 3.00 | 35° C., 2 Bar | 105 | 185.40 | 250.11 | 2541.33 | 463.60 | 219.75 | 706.31 | 158.52 | 2422.56 |
| 6FDA-FDA:ZIF-8-90-PDA = 3:1 | 3.00 | 23° C., 2 Bar | 75 | 2.63 | 1.66 | 148.17 | 2.50 | 0.63 | 0.42 | 0.03 | 67.96 |
| PIM1:ZIF-8-90-EDA = 2:1 | 3.00 | 35° C., 2 Bar | 99 | 63.40 | 73.95 | 1684.10 | 136.86 | 49.78 | 299.58 | 32.34 | 1482.17 |

TABLE 4

(Ideal Selectivity Data)

| Sample | Plasma (min) | Test Condition | Thickness (μm) | Ideal Selectivity | | | |
|---|---|---|---|---|---|---|---|
| | | | | $CH_4/N_2$ | $N_2/CH_4$ | $C_3H_6/C_3H_8$ | $C_2H_4/C_2H_6$ |
| PIM:ZIF-8-90-EDA at 2:1 | 0.00 | 23° C., 2 Bar | 96 | 1.43 | 0.70 | 2.46 | 2.97 |
| PIM:ZIF-8-90-EDA at 2:1 | 3.00 | 23° C., 2 Bar | 99 | 1.24 | 0.80 | 3.30 | 2.92 |
| PIM:ZIF-8-90-EDA at 2:1 | 4.00 | 23° C., 2 Bar | 99 | 1.08 | 0.92 | 4.02 | 2.32 |
| PIM:ZIF-8 at 2:1 | 0.00 | 35° C., 2 Bar | 109 | 1.28 | 0.78 | 4.14 | 2.53 |
| PIM:ZIF-8 at 2:1 | 3.00 | 35° C., 2 Bar | 105 | 1.35 | 0.74 | 4.46 | 2.11 |
| 6FDA-FDA:ZIF-8-90-PDA = 3:1 | 3.00 | 23° C., 2 Bar | 75 | 0.63 | 1.58 | 14.00 | 3.97 |
| PIM1:ZIF-8-90-EDA = 2:1 | 3.00 | 35° C., 2 Bar | 99 | 1.17 | 0.86 | 9.26 | 2.75 |

| Sample | Ideal Selectivity | | | | | | |
|---|---|---|---|---|---|---|---|
| | $C_3H_8/C_2H_6$ | $C_3H_6/N_2$ | $H_2/C_3H_8$ | $H_2/N_2$ | $H_2/CH_4$ | $CO_2/CH_4$ | $CO_2/N_2$ |
| PIM:ZIF-8-90-EDA at 2:1 | 5.82 | 14.93 | 1.12 | 6.81 | 4.77 | 13.20 | 18.85 |
| PIM:ZIF-8-90-EDA at 2:1 | 2.46 | 9.23 | 14.28 | 39.88 | 32.10 | 17.69 | 21.97 |
| PIM:ZIF-8-90-EDA at 2:1 | 4.98 | 16.03 | 17.82 | 71.12 | 65.76 | 24.94 | 26.97 |
| PIM:ZIF-8 at 2:1 | 1.02 | 3.50 | 14.67 | 12.39 | 9.68 | 9.08 | 11.63 |
| PIM:ZIF-8 at 2:1 | 0.72 | 3.81 | 16.03 | 13.71 | 10.16 | 9.69 | 13.07 |
| 6FDA-FDA:ZIF-8-90-PDA = 3:1 | 0.05 | 0.16 | 4939.00 | 56.34 | 89.26 | 40.94 | 25.84 |
| PIM1:ZIF-8-90-EDA = 2:1 | 0.65 | 4.73 | 52.08 | 26.56 | 22.77 | 20.04 | 23.38 |

TABLE 6

(Permeability Data)

| Sample | UV Time (hours) | Test Conditions | Thickness (μm) | Permeability (Barrer) | | | | | | | |
|---|---|---|---|---|---|---|---|---|---|---|---|
| | | | | $N_2$ | $CH_4$ | $H_2$ | $C_2H_4$ | $C_2H_6$ | $C_3H_6$ | $C_3H_8$ | $CO_2$ |
| 6FDA-DAM:ZIF-8-90-EDA = 2:1 | 4.5 | 23° C., atmospheric | 159 | 34.83 | 17.43 | 1373.75 | 24.06 | 4.90 | 5.43 | 0.34 | 831.53 |
| 6FDA-DAM:ZIF-8-90-EDA = 2:1 | 8 | 23° C., atmospheric | 135 | 5.12 | 1.53 | 707.94 | 2.43 | 0.35 | 0.76 | 0.07 | 148.14 |
| PIM1:6FDA-DAM:ZIF-8-90-EDA = 3:1:1 | 5 | 23° C., atmospheric | 159 | 159.04 | 148.75 | 3227.05 | 249.28 | 79.05 | 402.58 | 27.19 | 2948.58 |

TABLE 7

(Ideal Selectivity Data)

| Sample | UV Time (hours) | Test Conditions | Thickness (μm) | Ideal Selectivity | | | |
|---|---|---|---|---|---|---|---|
| | | | | $CH_4/N_2$ | $N_2/CH_4$ | $C_3H_6/C_3H_8$ | $C_2H_4/C_2H_6$ |
| 6FDA-DAM:ZIF-8-90-EDA = 2:1 | 4.5 | 23° C., atmospheric | 159 | 0.50 | 2.00 | 15.94 | 4.91 |
| 6FDA-DAM:ZIF-8-90-EDA = 2:1 | 8 | 23° C., atmospheric | 135 | 0.30 | 3.34 | 11.39 | 6.97 |

TABLE 7-continued

| | | (Ideal Selectivity Data) | | | | | |
|---|---|---|---|---|---|---|---|
| PIM1:6FDA-DAM:ZIF-8-90-EDA = 3:1:1 | 5 | 23° C., atmospheric | 159 | 0.94 | 1.07 | 14.80 | 3.15 |

| | Ideal Selectivity | | | | | | |
|---|---|---|---|---|---|---|---|
| Sample | $C_3H_8/C_2H_6$ | $C_3H_6/N_2$ | $H_2/C_3H_8$ | $H_2/N_2$ | $H_2/CH_4$ | $CO_2/CH_4$ | $CO_2/N_2$ |
| 6FDA-DAM:ZIF-8-90-EDA = 2:1 | 0.07 | 0.16 | 4029.18 | 39.44 | 78.80 | 47.69 | 23.87 |
| 6FDA-DAM:ZIF-8-90-EDA = 2:1 | 0.19 | 0.15 | 10648.96 | 138.26 | 461.56 | 96.58 | 28.93 |
| PIM1:6FDA-DAM:ZIF-8-90-EDA = 3:1:1 | 0.34 | 2.53 | 118.67 | 20.29 | 21.69 | 19.82 | 18.54 |

The invention claimed is:

1. A treated mixed matrix polymeric membrane comprising a polymeric matrix and a plurality of at least a first metal-organic framework (MOF), wherein the plurality of the first MOFs are attached to the polymeric matrix through covalent bonds formed between a functional group from the MOFs and a reactive group from the polymers of the polymeric matrix, wherein the polymeric matrix comprises a polymer of intrinsic microporosity (PIM), or a blend of at least two of PIM and a polyimide polymer, and/or a polyetherimide polymer, and wherein the polymeric membrane has been plasma-treated, treated with electromagnetic radiation, or thermally-treated.

2. The treated mixed matrix polymeric membrane of claim 1, wherein the plurality of the first MOFs are zeolitic imidazolate frameworks (ZIFs) and wherein the functional group is on an imidazolate ligand of the first ZIFs.

3. The treated mixed matrix polymeric membrane of claim 2, wherein the imidazolate ligand is an imidazole carboxyaldehyde ligand that has been functionalized with an amino group or an imine group.

4. The treated mixed matrix polymeric membrane of claim 2, wherein the functional group is an amino group or an imine group.

5. The treated mixed matrix polymeric membrane of claim 2, wherein each of the first ZIFs comprises (1) an imidazole carboxyaldehyde ligand that has been functionalized with an amino group and (2) a methyl imidazole ligand.

6. The treated mixed matrix polymeric membrane of claim 5, wherein 1 to 99% of the imidazolate ligands of the first ZIFs are functionalized with a functional group.

7. The treated mixed matrix polymeric membrane of claim 2, wherein the plurality of first ZIFs are ZIF-8-90 or ZIF-8-90-EDA.

8. The treated mixed matrix polymeric membrane of claim 7, further comprising a plurality of at least a second ZIF that is different from the plurality of the first ZIFs.

9. The treated mixed matrix polymeric membrane of claim 8, wherein the plurality of first ZIFs is ZIF-8-90 and the plurality of second ZIFs is ZIF-8-90-EDA.

10. The treated mixed matrix polymeric membrane of claim 1, wherein the plurality of first MOFs is isoreticular metal-organic framework-3 (IRMOF-3).

11. The treated mixed matrix polymeric membrane of claim 10, further comprising a plurality of at least a second MOF that is different from the first MOF.

12. The treated mixed matrix polymeric membrane of claim 1, wherein the first MOFs have a pore size between about 0.1 and 5 nm.

13. The treated mixed matrix polymeric membrane of claim 1, wherein the mixed matrix polymeric membrane comprises 5 to 90 mole percent of MOFs.

14. A method for separating at least one component from a mixture of components, the process comprising: contacting a mixture of components on a first side of the treated mixed matrix polymeric membrane of claim 1, such that at least a first component is retained on the first side in the form of a retentate and at least a second component is permeated through the membrane to a second side in the form of a permeate.

15. The method of claim 14, wherein the first component is a first gas and the second component is a second gas.

16. The method of claim 15, wherein the first gas is nitrogen and the second gas is hydrogen, or the first gas is methane and the second gas is hydrogen, or the first gas is methane and the second gas is carbon dioxide.

17. A method of preparing the treated mixed matrix polymeric membrane of claim 1 comprising:
 (a) obtaining a plurality of at least the first MOFs comprising at least one functional group;
 (b) attaching the plurality of the first MOFs to a polymer or a polymer blend through covalent bonds formed between the matrix and the functional group of the MOFs;
 (c) forming a polymeric membrane comprising a polymeric matrix with the polymer or polymeric blend from step (b); and
 (d) subjecting at least a portion of the surface of the formed polymeric membrane to plasma, electromagnetic radiation, or thermal treatment, or any combination thereof.

18. The method of claim 17, wherein the membrane is subjected to plasma gas comprising a reactive species for 30 seconds to 30 minutes.

19. The method of claim 18, wherein the reactive species comprises $O_2$ and $CF_4$ at a ratio of up to 1:2.

20. The method of claim 17, wherein at least a portion of the surface of the formed polymeric membrane is subjected to a combination of at least two of plasma, electromagnetic radiation, or thermal treatment, and wherein said treatments are sequential or overlap one another.

* * * * *